United States Patent
Park

(10) Patent No.: US 10,651,694 B2
(45) Date of Patent: May 12, 2020

(54) WIRELESS POWER TRANSMISSION METHOD AND DEVICE THEREFOR

(71) Applicant: LG Electronics Inc., Seoul (KR)

(72) Inventor: Yongcheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/308,325

(22) PCT Filed: Jun. 8, 2017

(86) PCT No.: PCT/KR2017/005941
§ 371 (c)(1),
(2) Date: Dec. 7, 2018

(87) PCT Pub. No.: WO2017/213428
PCT Pub. Date: Dec. 14, 2017

(65) Prior Publication Data
US 2019/0260241 A1 Aug. 22, 2019

Related U.S. Application Data

(60) Provisional application No. 62/471,896, filed on Mar. 15, 2017, provisional application No. 62/425,042,
(Continued)

(51) Int. Cl.
*H02J 50/80* (2016.01)
*H02J 50/10* (2016.01)
(Continued)

(52) U.S. Cl.
CPC ............... *H02J 50/80* (2016.02); *H02J 7/02* (2013.01); *H02J 7/025* (2013.01); *H02J 50/10* (2016.02);
(Continued)

(58) Field of Classification Search
CPC .. H02J 50/80; H02J 50/10; H02J 50/60; H02J 7/025; H04L 5/0055
See application file for complete search history.

(56) References Cited

U.S. PATENT DOCUMENTS

2010/0253281 A1 10/2010 Li
2012/0299389 A1* 11/2012 Lee ...................... H04B 5/0031
307/104
(Continued)

FOREIGN PATENT DOCUMENTS

JP 2009268311 11/2009
JP 2015523848 8/2015
(Continued)

OTHER PUBLICATIONS

International Search Report in International Application No. PCT/KR2017/005941, dated Sep. 25, 2017, 7 pages (with English translation).
(Continued)

*Primary Examiner* — Jared Fureman
*Assistant Examiner* — Duc M Pham
(74) *Attorney, Agent, or Firm* — Fish & Richardson P.C.

(57) ABSTRACT

A wireless power transmission method executed by a power transmitter comprising multi-coils, according to one embodiment of the present invention, comprises the steps of: detecting a second power receiver while transmitting power to a first power receiver; determining at least one primary coil adequate for power transmission; by using the determined at least one primary coil, determining whether the second power receiver supports a shared mode protocol; and if the second power receiver supports the shared mode protocol, transmitting power to the first and second power receivers according to the shared mode protocol, wherein the shared mode protocol may be a protocol for simultaneously
(Continued)

managing information exchanges between the power transmitter and multiple power receivers.

14 Claims, 15 Drawing Sheets

Related U.S. Application Data filed on Nov. 21, 2016, provisional application No. 62/413,947, filed on Oct. 27, 2016, provisional application No. 62/347,575, filed on Jun. 8, 2016.

(51) Int. Cl.
    *H02J 50/60*     (2016.01)
    *H02J 7/02*     (2016.01)
    *H04L 5/00*     (2006.01)
    *H04B 5/00*     (2006.01)

(52) U.S. Cl.
    CPC ............ *H02J 50/60* (2016.02); *H04L 5/0055* (2013.01); *H04B 5/0037* (2013.01)

(56) References Cited

U.S. PATENT DOCUMENTS

| | | | |
|---|---|---|---|
| 2015/0312004 A1* | 10/2015 | Zhou | H04L 5/0055 |
| | | | 370/330 |
| 2016/0118810 A1 | 4/2016 | Park | |

FOREIGN PATENT DOCUMENTS

| | | |
|---|---|---|
| JP | 2017209010 | 11/2017 |
| KR | 20130051970 | 5/2013 |
| KR | 101490732 | 2/2015 |
| KR | 20150023897 | 3/2015 |
| KR | 20160011143 | 1/2016 |
| KR | 20160030907 | 3/2016 |
| WO | WO2015156628 | 10/2015 |

OTHER PUBLICATIONS

Extended European Search Report in European Application No. 17810551.6, dated Nov. 25, 2019, 9 pages.

\* cited by examiner

【FIG. 1】
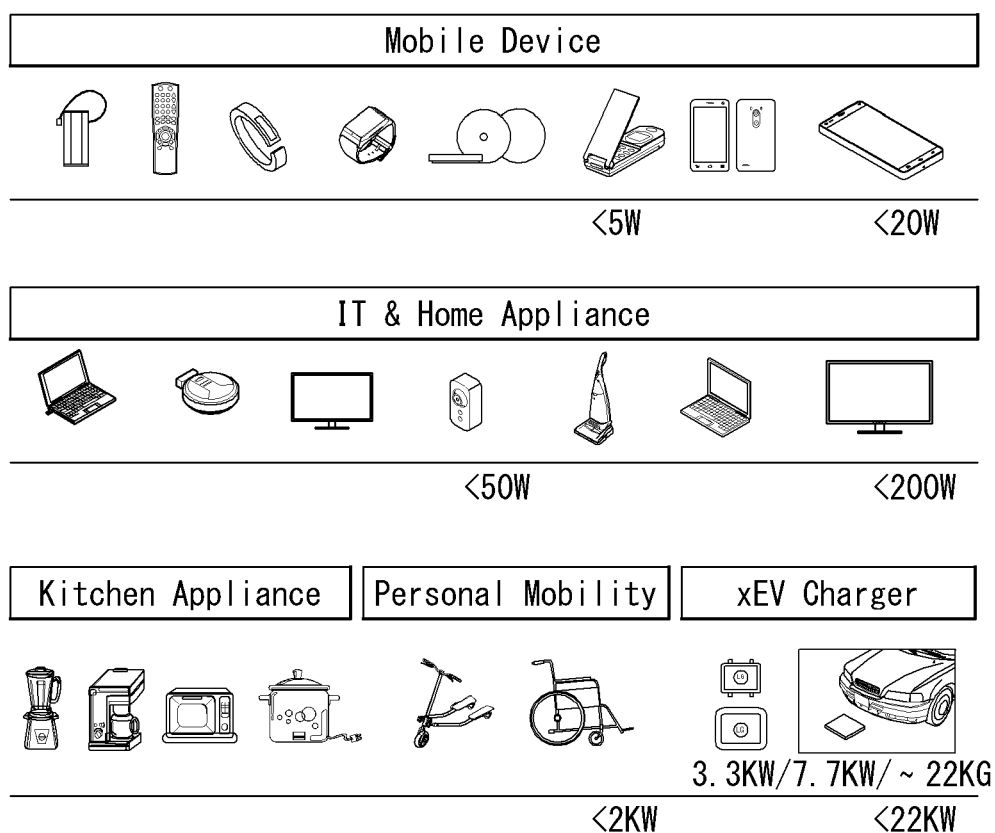

[FIG. 2]
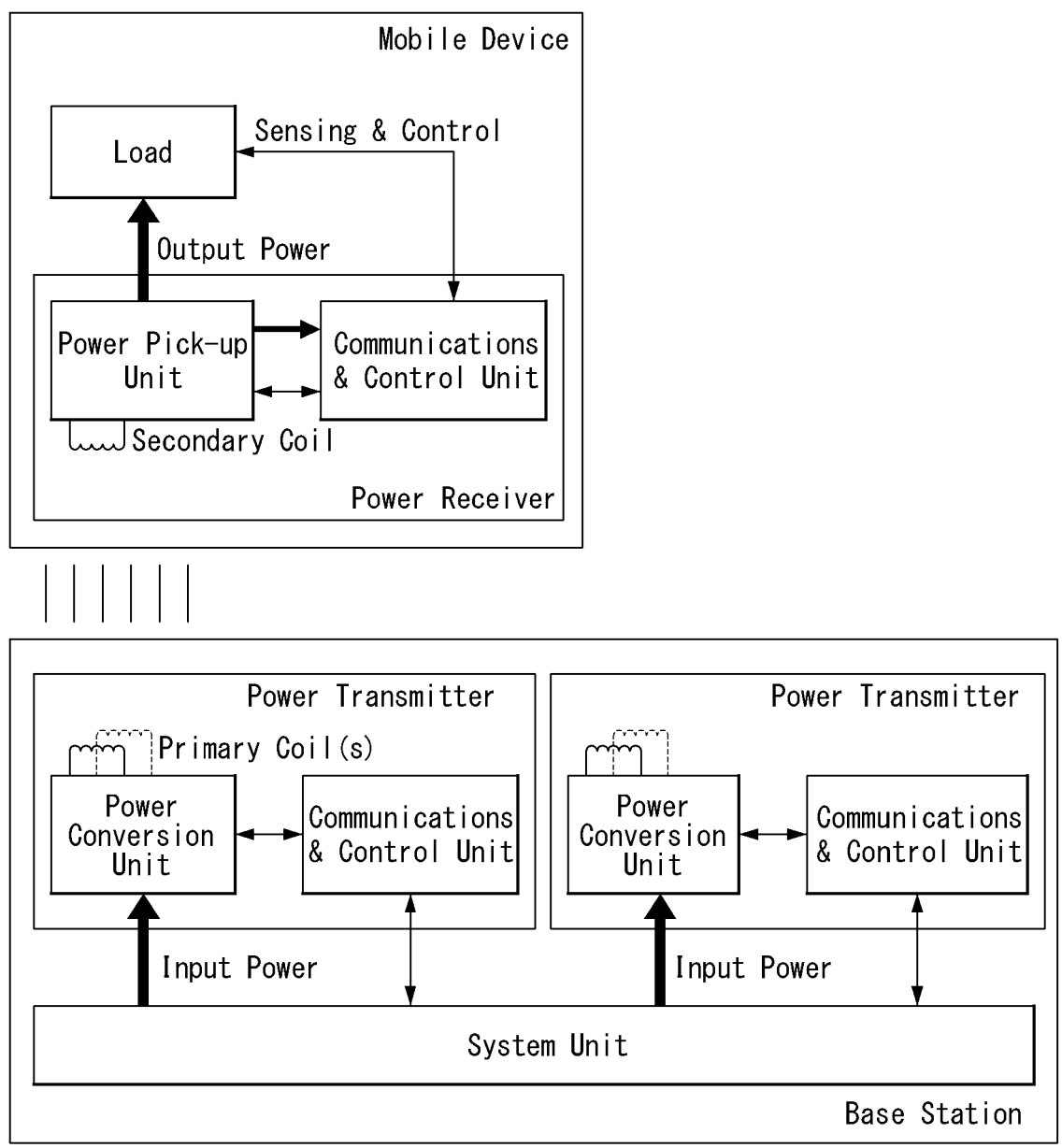

[FIG. 3]
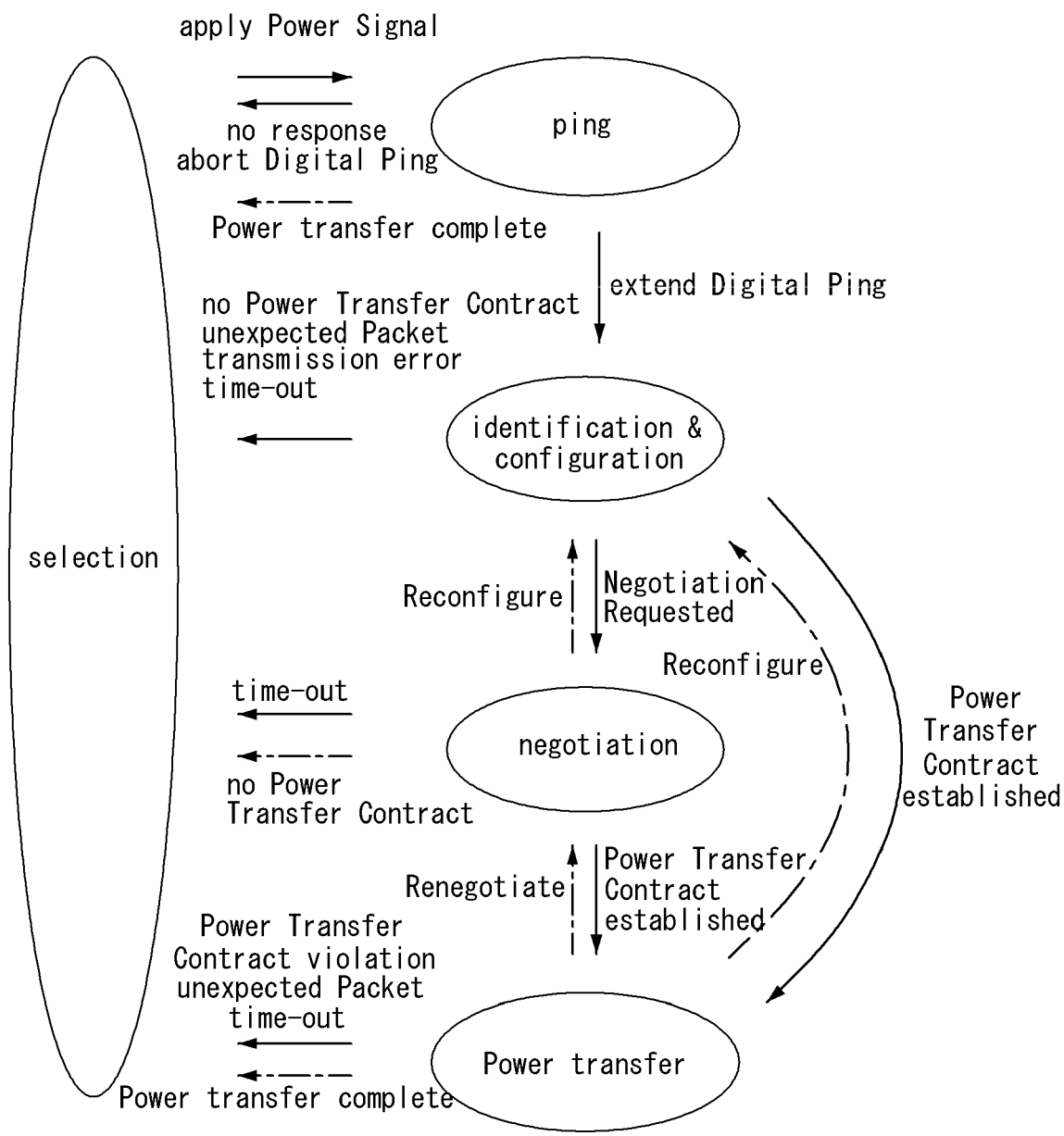

[FIG. 4]
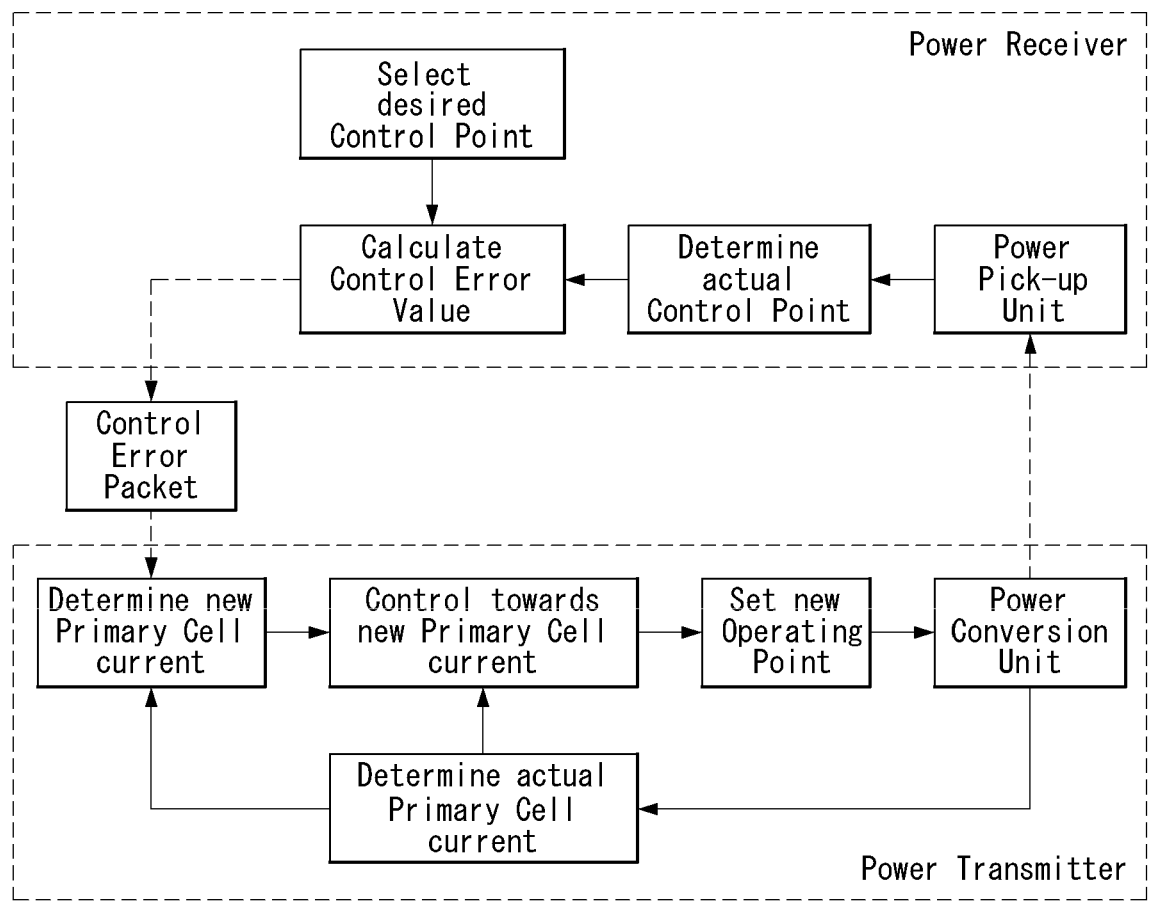

[FIG. 5]
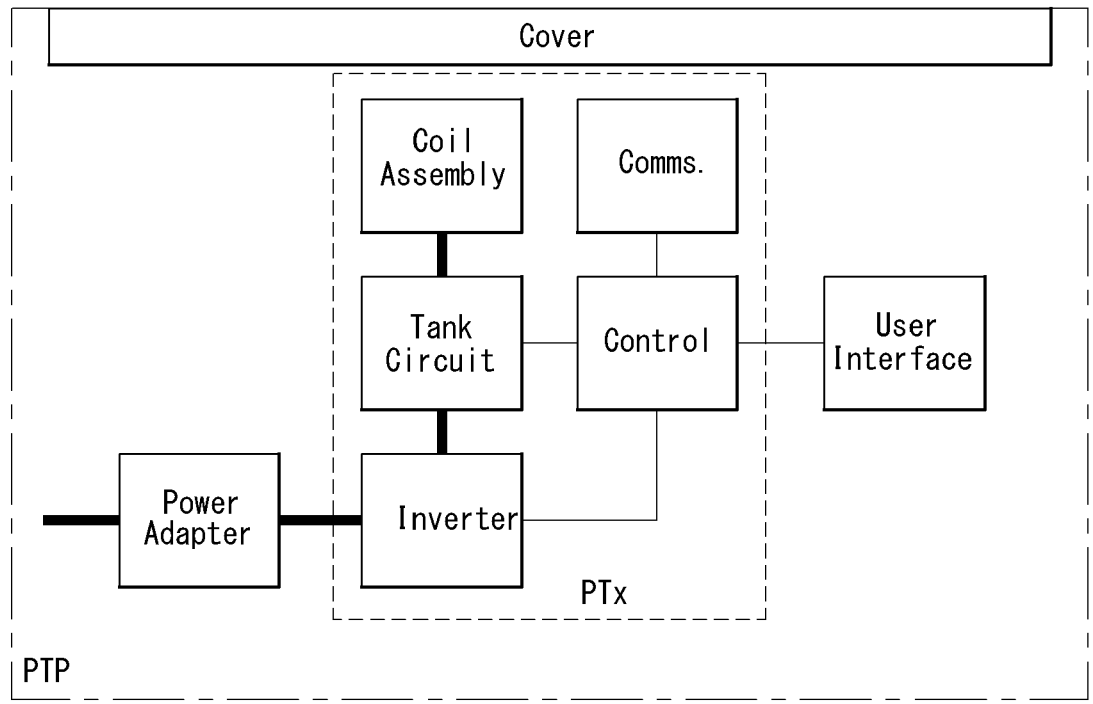
[FIG. 6]
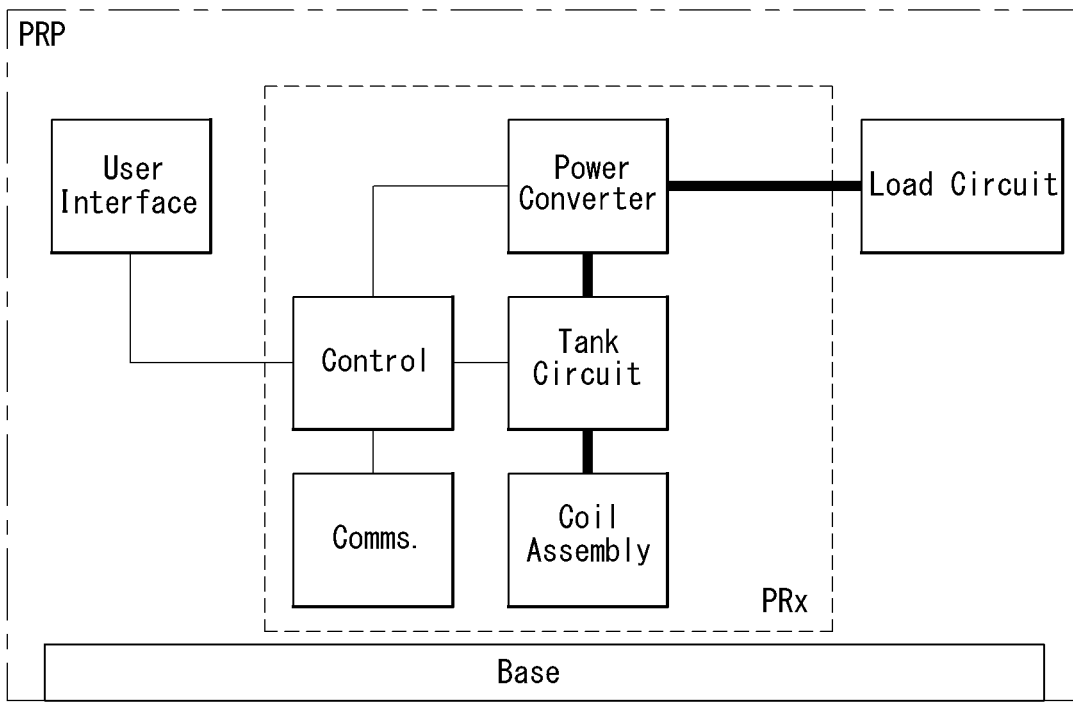

[FIG. 7]
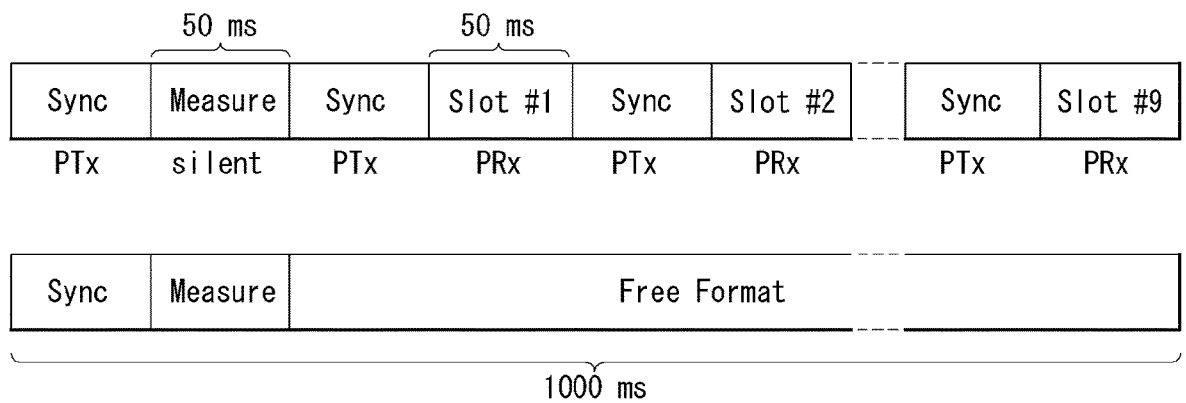
[FIG. 8]
| Preamble | ZERO | Response | Type | Info | Parity |
Response
'00' : no comms
'01' : comms error
'10' : NAK
'11' : ACK
Type
ZERO: slot sync
ONE: frame sync
Parity : odd
Info (Type is ZERO)
'00' : allocated
'01' : locked
'10' : free
'11' : reserved
Info (Type is ONE)
'00' : slotted
'01' : free format
'10' : reserved
'11' : reserved

[FIG. 9]
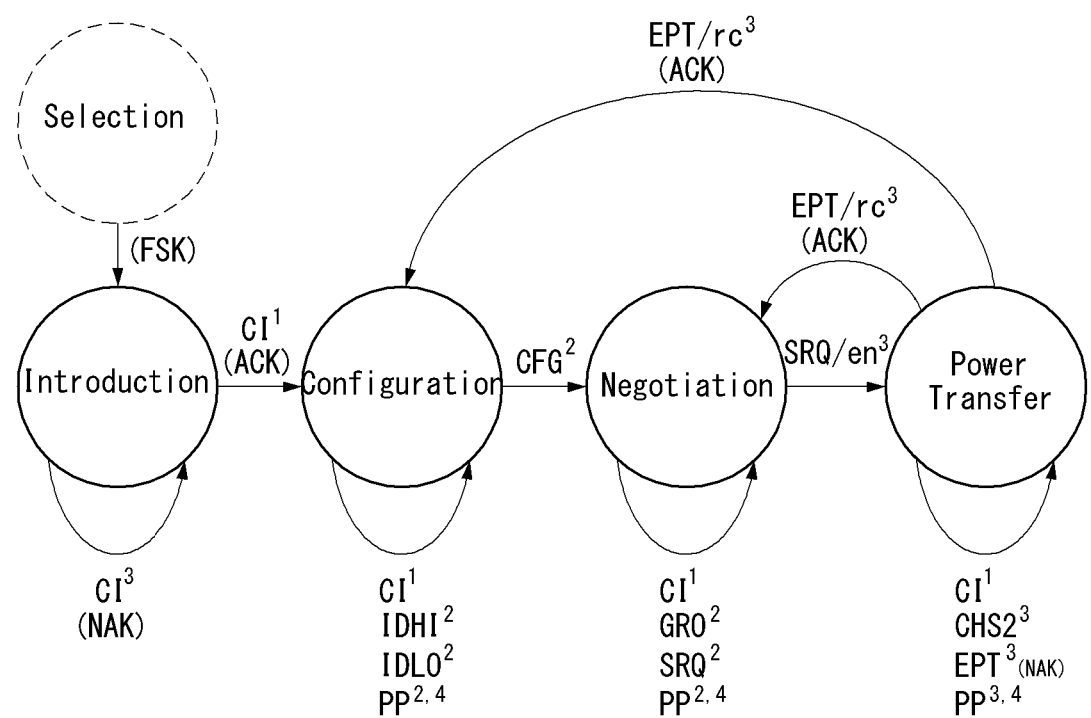

[FIG. 10]
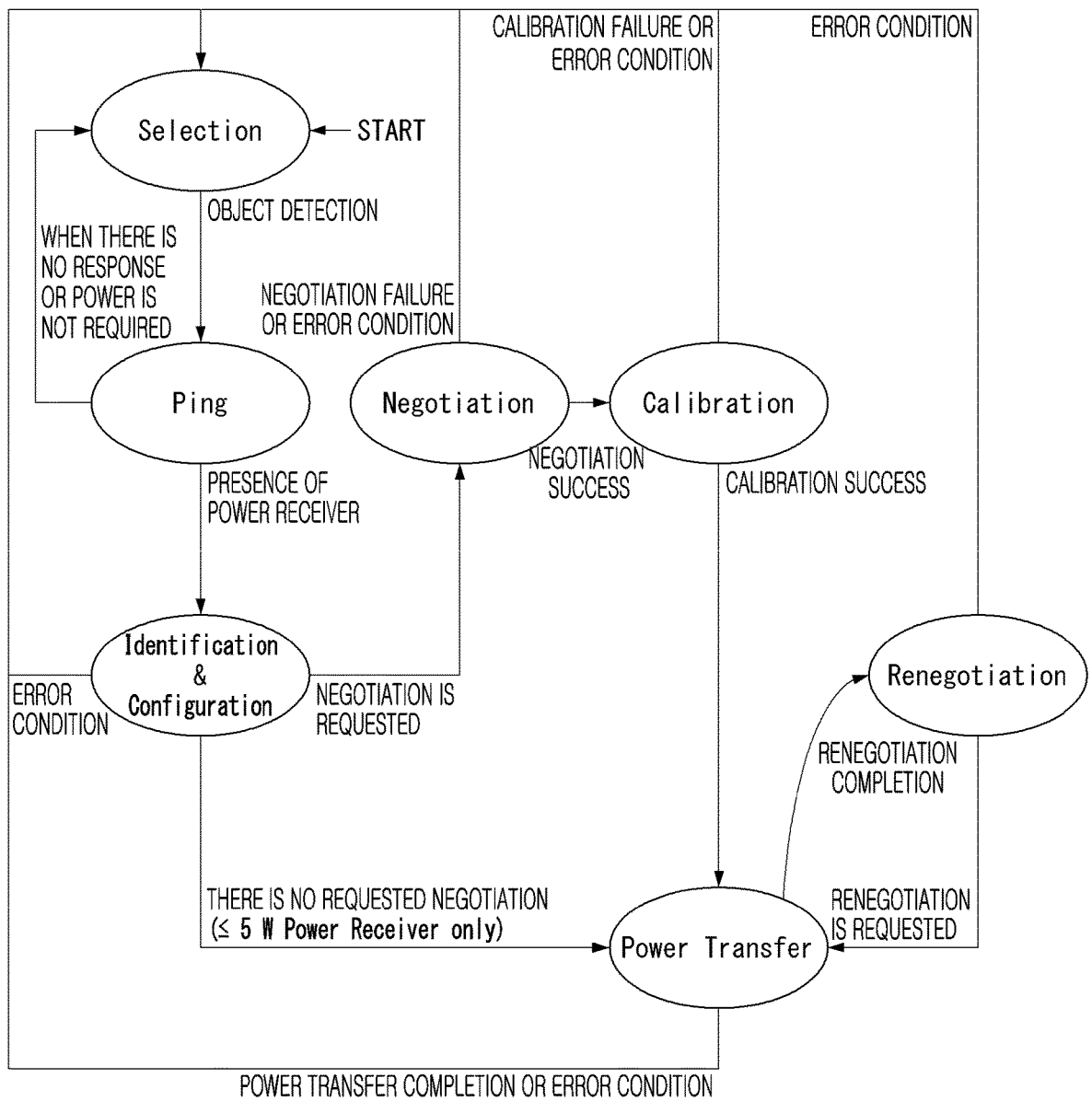

[FIG. 11]
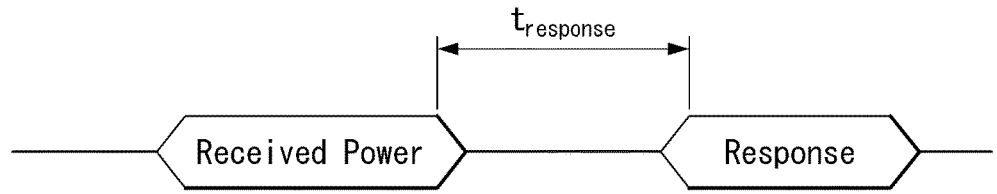
[FIG. 12]
| | Message | Description | Format |
|---|---|---|---|
| ACK | Acknowledge | Accept a request | '11111111' |
| NAK | Not-Acknowledge | Deny a request | '00000000' |
| ND | Not-Defined | Unrecognized or invalid request | '01010101' |
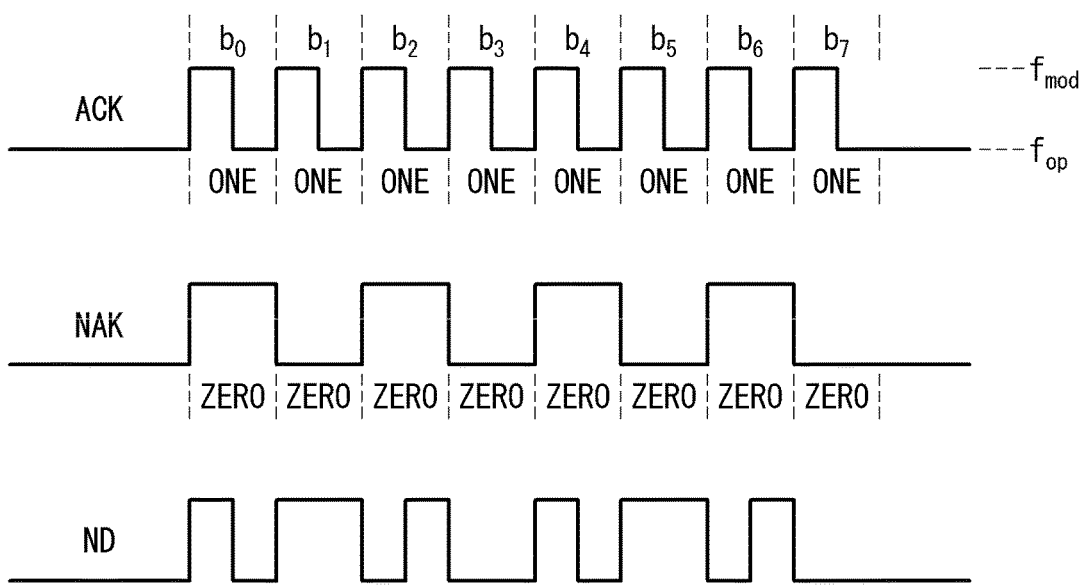

[FIG. 13]
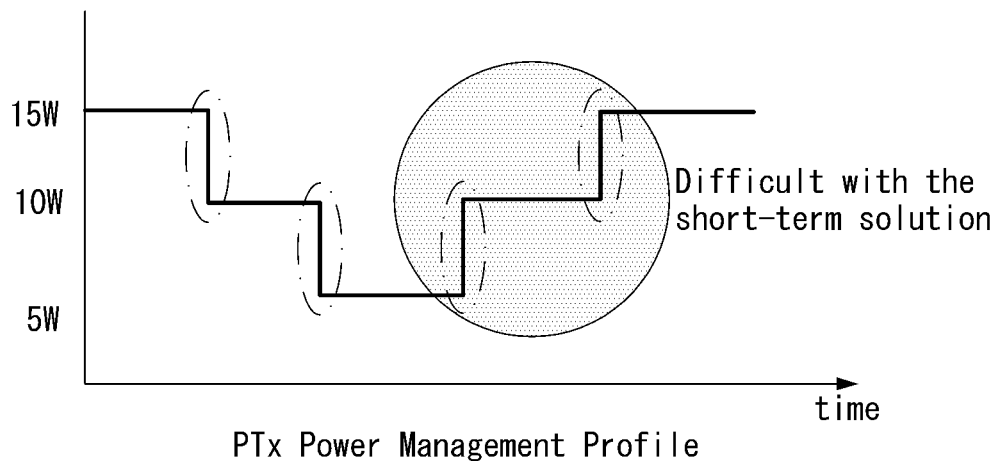
PTx Power Management Profile
[FIG. 14]
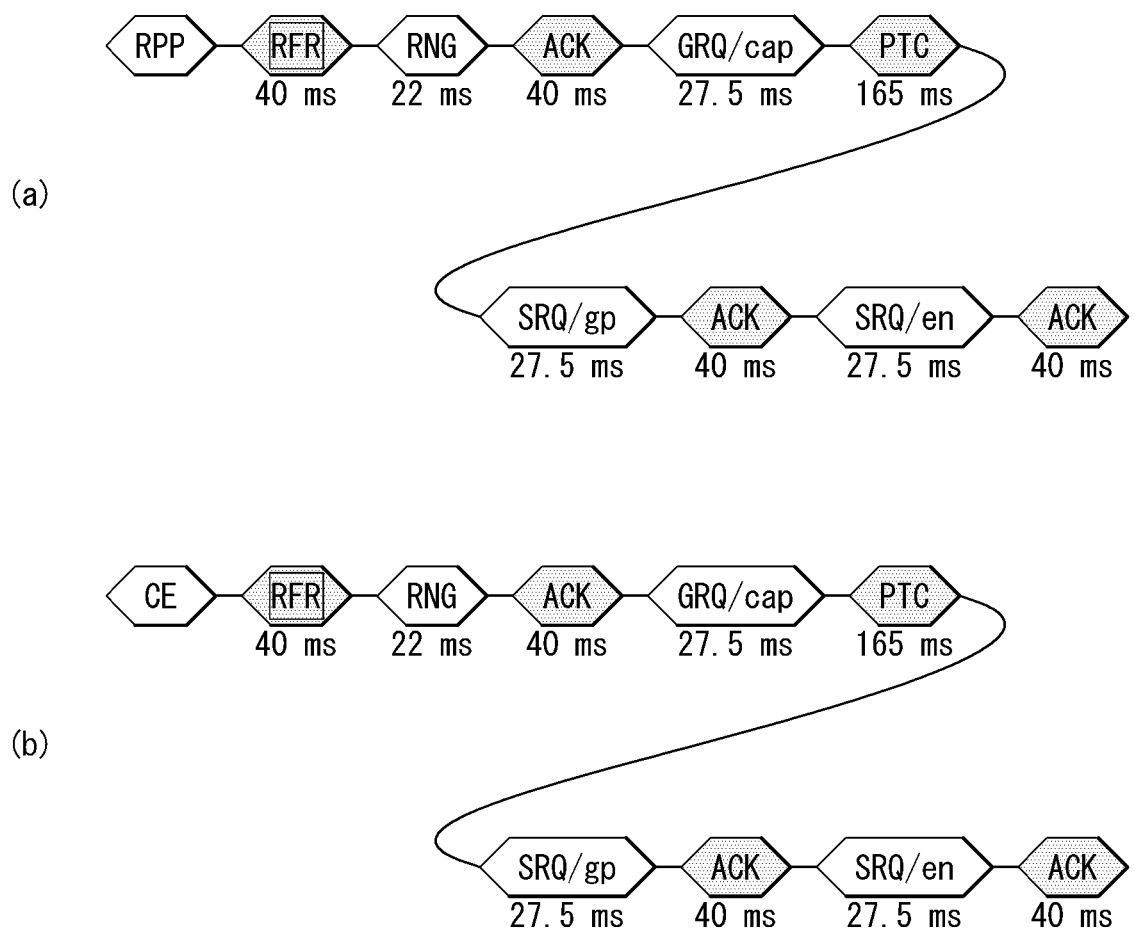

[FIG. 15]
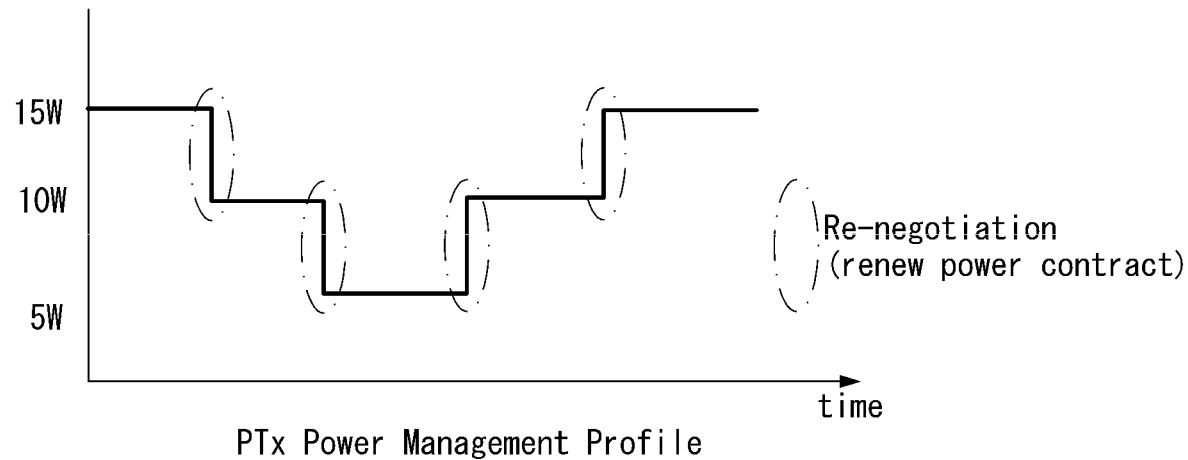
PTx Power Management Profile
[FIG. 16]
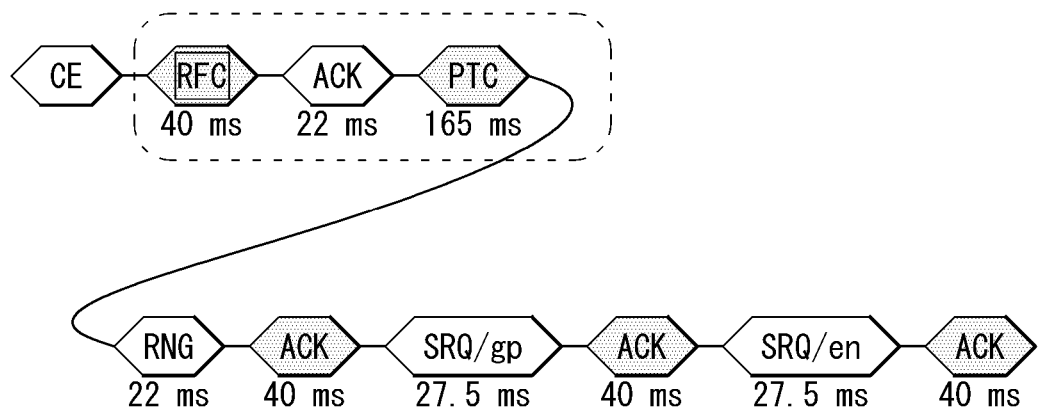
[FIG. 17]
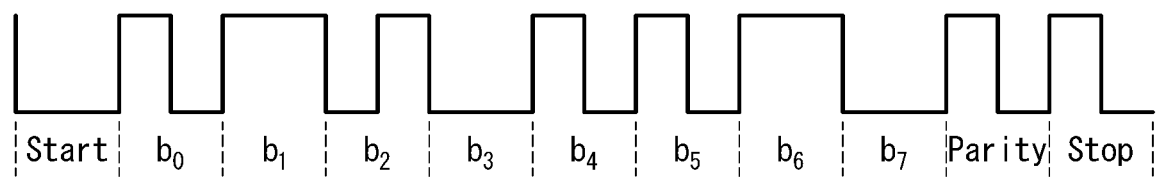

[FIG. 18]
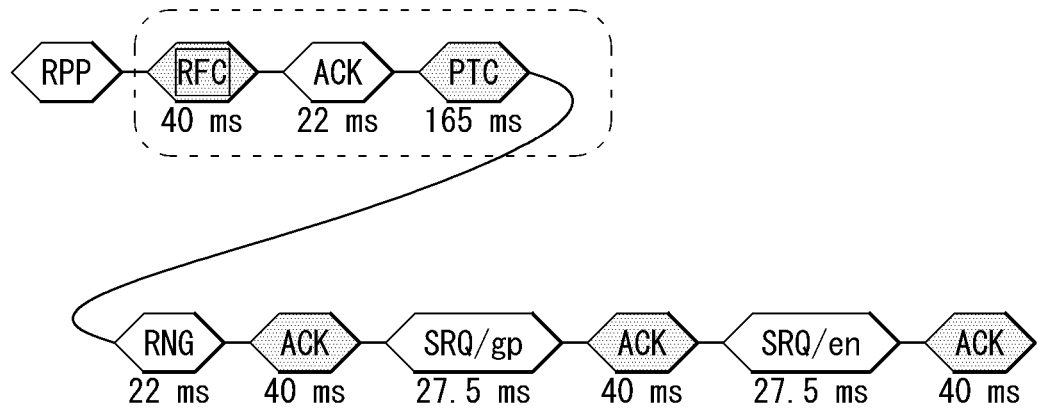
[FIG. 19]
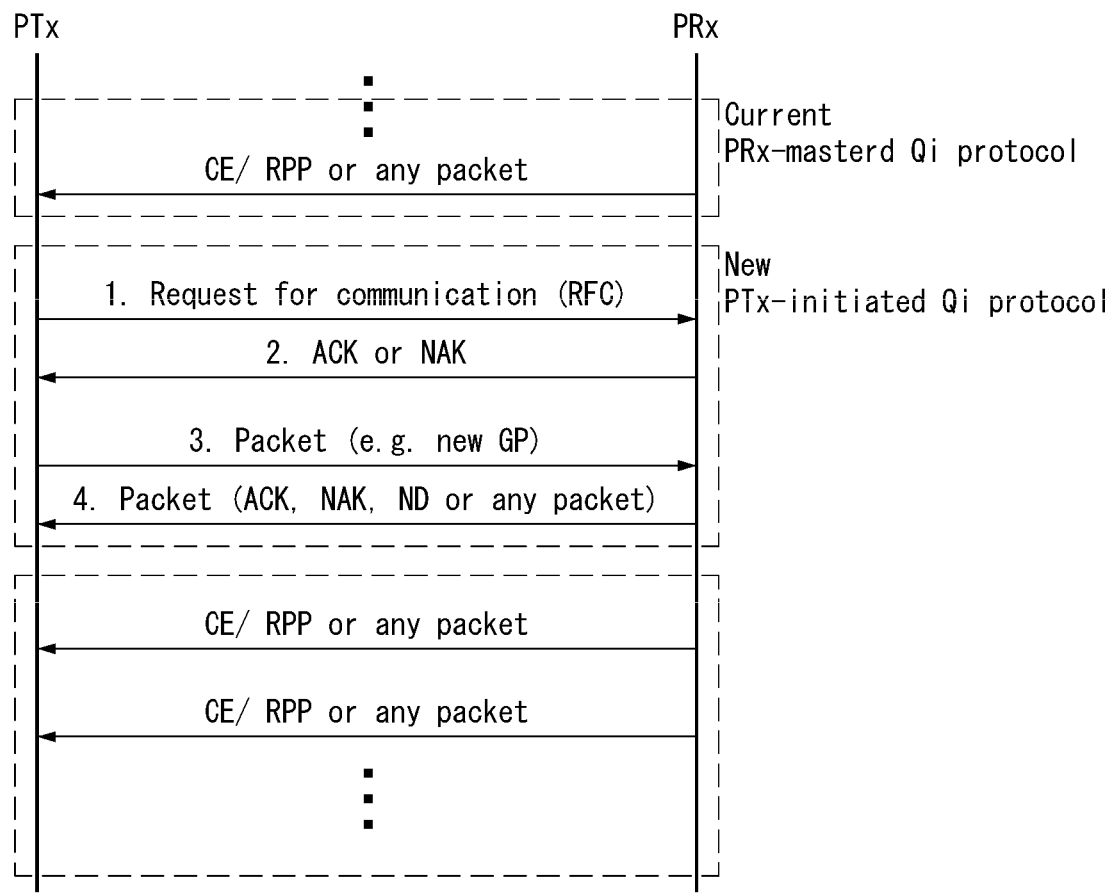

[FIG. 20]
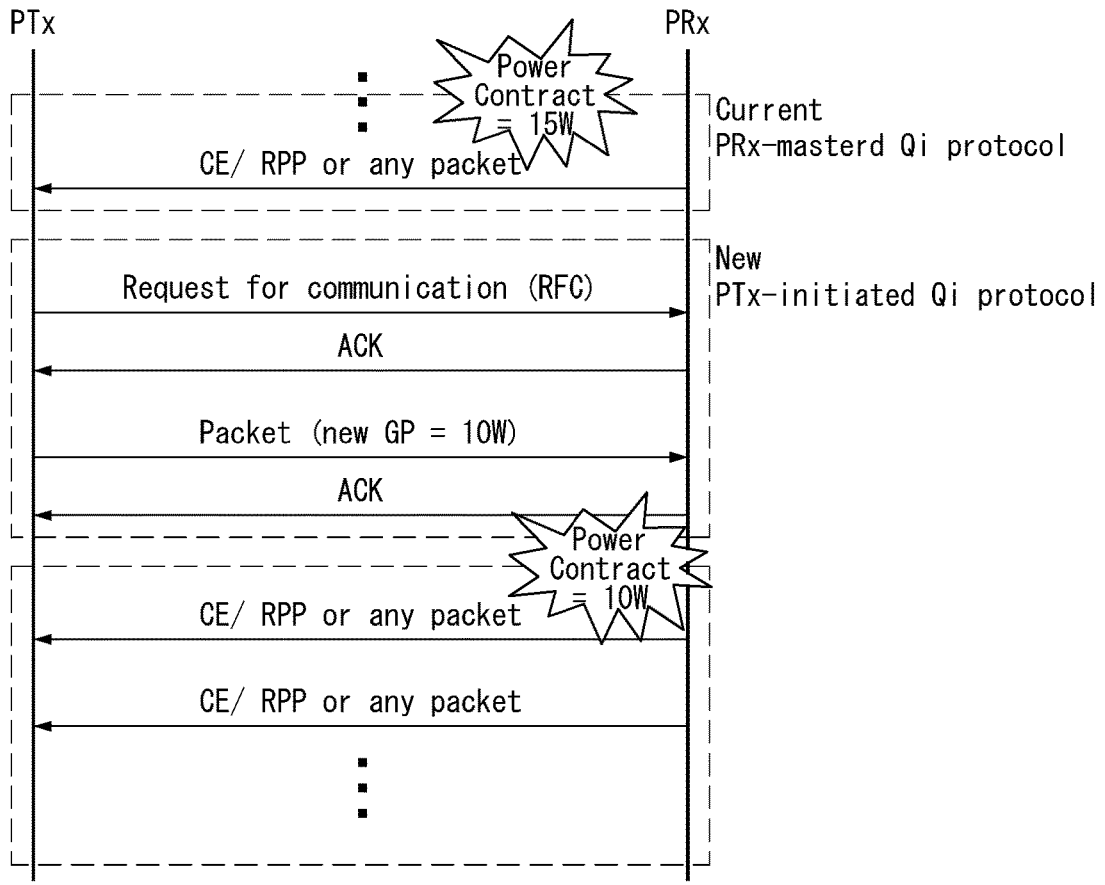
[FIG. 21]
| | b7 | b6 | b5 | b4 | b3 | b2 | b1 | b0 |
|---|---|---|---|---|---|---|---|---|
| B0 | Reserved | | \multicolumn{6}{l|}{Guaranteed Power Value} | | | | | |
| | b7 | b6 | b5 | b4 | b3 | b2 | b1 | b0 |
|---|---|---|---|---|---|---|---|---|
| B0 | Reserved | Reserved | Guaranteed Power Value | Guaranteed Power Value | Guaranteed Power Value | Guaranteed Power Value | Guaranteed Power Value | Guaranteed Power Value |

[FIG. 22]

|  | $b_7$ | $b_6$ | $b_5$ | $b_4$ | $b_3$ | $b_2$ | $b_1$ | $b_0$ |
|---|---|---|---|---|---|---|---|---|
| $B_0$ | Message |||||||||

| | Message | Description | Format |
|---|---|---|---|
| ACK | Acknowledge | Accept a request | '11111111' |
| NAK | Not-Acknowledge | Deny a request | '00000000' |
| ND | Not-Defined | Unrecognized or invalid request | '01010101' |

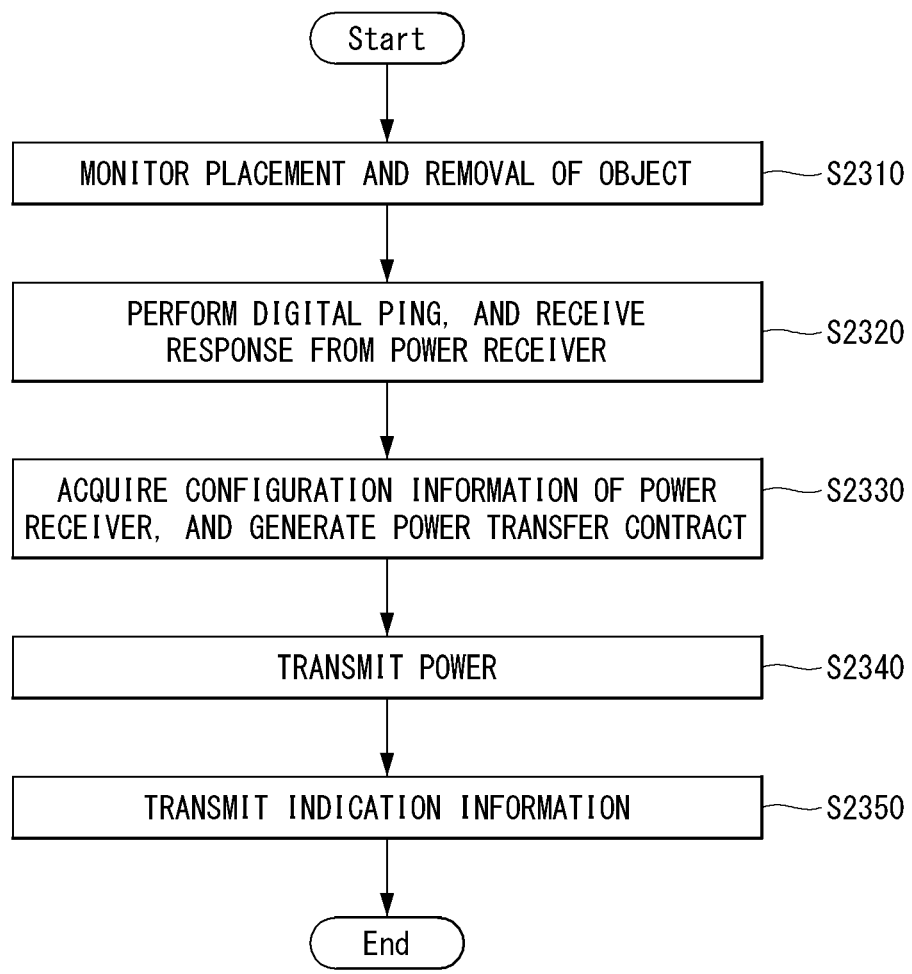
[FIG. 23]

WIRELESS POWER TRANSMISSION METHOD AND DEVICE THEREFOR

CROSS-REFERENCE TO RELATED APPLICATIONS

This application is a National Stage application under 35 U.S.C. § 371 of International Application No. PCT/KR2017/005941, filed on Jun. 8, 2017, which claims the benefit of U.S. Provisional Application No. 62/471,896, filed on Mar. 15, 2017, U.S. Provisional Application No. 62/425,042, filed on Nov. 21, 2016, U.S. Provisional Application No. 62/413,947, filed on Oct. 27, 2016, and U.S. Provisional Application No. 62/347,575, filed on Jun. 8, 2016. The disclosures of the prior applications are incorporated by reference in their entirety.

TECHNICAL FIELD

The present invention relates to a wireless power transmission method and a device therefor.

BACKGROUND ART

A contactless wireless charging method is an energy transfer method for electromagnetically transferring energy without using a wire in a method for sending energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

DISCLOSURE

Technical Problem

Since a sender or a master that initiates/leads communication in a communication protocol between a power transmitter and a power receiver defined in a current WPC standard is the power receiver, the power transmitter may transmit only a response to a request of the power receiver, and as a result, the power transmitter may not detect foreign objects in a charge region (or a magnetic field region) or may not adjust a guaranteed power level initiatively directly at a desired timing even though a charging environment is changed.

Accordingly, an embodiment of the present invention is to propose an efficient and stable power transmitting/receiving method by reflecting a current surrounding situation/environment in real time by enabling a power transmitter to acquire a status/authority as a master/sender according to a situation.

Technical Solution

According to an embodiment of the present invention, a wireless power transmission method executed by a power transmitter may include: monitoring placement and removal of an object on and from an interface surface of the power transmitter; performing digital ping and receiving a response from a power receiver; acquiring configuration information of the power receiver and generating a power transfer contract with the power receiver by using the configuration information; transmitting power to the power receiver based on the power transfer contract; and transmitting indication information for initiating communication with the power receiver to the power receiver.

Further, the indication information may be information for requesting initiation of communication with the power receiver for renegotiating the power transfer contract.

In addition, the transmitting of the power to the power receiver may include receiving a predetermined packet from the power receiver, and the indication information may be transmitted to the power receiver as a response to the predetermined packet.

Further, when bit patterns are defined for an acknowledge (ACK) response indicating acceptance of the request of the power receiver included in the predetermined packet, a non-acknowledge (NAK) response indicating denial of the request, and a not-defined (ND) response indicating that the request is not valid, a bit pattern of the indication information may be defined as a pattern different from the bit patterns of the ACK response, the NAK response, and the ND response.

In addition, the predetermined packet may correspond to a received power packet for changing a format of a received power packet determined in the power transfer contract or a control error packet used for determining an operating point of the power transmitter.

Moreover, the indication information may include request information that the power transmitter requests for the power receiver to acquire an authority to transmit a predetermined packet.

Further, the predetermined packet may include a packet including information on a new guaranteed power level of the power transmitter.

In addition, the transmitting of the power to the power receiver may include receiving a predetermined packet from the power receiver, and the indication information may be transmitted to the power receiver as a response to the predetermined packet or within a transmission interval of the predetermined packet when the transmission interval increases to be equal to or more than a threshold.

In addition, the predetermined packet may correspond to a received power packet for changing a format of a received power packet determined in the power transfer contract or a control error packet used for determining an operating point of the power transmitter.

Further, when bit patterns are defined for an acknowledge (ACK) response indicating acceptance of the request of the power receiver included in the predetermined packet, a non-acknowledge (NAK) response indicating denial of the request, and a not-defined (ND) response indicating that the request is not valid, a bit pattern of the indication information may be defined as a pattern different from the bit patterns of the ACK response, the NAK response, and the ND response.

In addition, when the indication information is transmitted to the power receiver as a response to the predetermined packet, the indication information may further include response information to the predetermined packet in addition to the request information.

Further, when the indication information is transmitted within the transmission interval of the predetermined packet, a size of a packet carrying the indication information may be determined based on the transmission interval of the predetermined packet.

Further, the transmitting of the indication information to the power receiver may be performed when the foreign object is detected on the interface surface or when a surrounding temperature is detected as a high temperature equal to or higher than a predetermined temperature.

According to another embodiment of the present invention, a wireless power reception method executed by a power receive may include: detecting execution of digital ping of a power transmitter and transmitting a response to the detected digital ping; transmitting configuration information of the power receiver and establishing a power transfer contract based on the configuration information with the power transmitter; receiving power from the power receiver based on the power transfer contract; and receiving indication information for initiating communication with the power receiver from the power transmitter.

According to yet another embodiment of the present invention, a power transmitter may include: a coil assembly including at least one primary coil generating a magnetic field; a power conversion unit configured to convert electric energy into a power signal; and a communications and control unit configured to control communication and power transfer with a power receiver, in which the communications and control unit may be configured to monitor placement and removal of an object on and from an interface surface of the power transmitter, perform digital ping and receive a response from the power receiver, acquire configuration information of the power receiver and generate a power transfer contract with the power receiver by using configuration information, transmit power to the power receiver based on the power transfer contract, and transmit indication information for initiating communication with the power receiver to the power receiver.

Advantageous Effects

According to an embodiment of the present invention, a power transmitter has an effect of dynamically and appropriately adjusting a guaranteed power level at a desired time desired thereby according to a surrounding environment/situation.

Further, according to an embodiment of the present invention, full packet transmission of the power transmitter is possible without a collision with a Qi communication protocol already predefined in a WPC standard.

In addition, according to an embodiment of the present invention, full packet transmission of the power transmitter is possible without a collision with a packet transmitted by a power receiver.

Besides, various effects according to the embodiment of the present invention will be described below in detail.

DESCRIPTION OF DRAWINGS

FIG. 1 illustrates an embodiment of various electronic devices into which a wireless charging system is introduced.

FIG. 2 illustrates a wireless power transmission/reception system according to an embodiment of the present invention.

FIG. 3 is a block diagram illustrating a power transmission/reception method in an inductive mode.

FIG. 4 illustrates a power transmission control method in the inductive mode.

FIG. 5 illustrates a power transmission device according to an embodiment of the present invention.

FIG. 6 illustrates a power reception device according to an embodiment of the present invention.

FIG. 7 illustrates a frame structure for data communication during power transmission.

FIG. 8 is a diagram illustrating a sync packet according to an embodiment of the present invention.

FIG. 9 is a diagram illustrating a power transmission method in a shared mode.

FIG. 10 is a diagram illustrating a method for controlling a wireless power transmission/reception system to which FOD extension is applied according to an embodiment of the present invention.

FIG. 11 is a diagram illustrating a response timing of a power transmitter for a reception power packet according to an embodiment of the present invention.

FIG. 12 is a diagram illustrating a response format of the power transmitter according to an embodiment of the present invention.

FIG. 13 illustrates a power management profile of the power transmitter according to an embodiment of the present invention.

FIG. 14 illustrates a communication protocol between the power transmitter and a power receiver depending on proposal A of the present invention.

FIG. 15 is a diagram illustrating the power management profile of the power transmitter depending on proposal A of the present invention.

FIG. 16 illustrates the communication protocol between the power transmitter and the power receiver depending on proposal B of the present invention.

FIG. 17 illustrates 1 B (byte) data according to an embodiment of the present invention.

FIG. 18 illustrates the communication protocol between the power transmitter and the power receiver depending on proposal C of the present invention.

FIG. 19 illustrates a flowchart regarding a power transmission/reception method depending on proposal B or C of the present invention.

FIG. 20 is a flowchart illustrating an embodiment depending on proposal B or C when the power transmitter downgrades a GP level from 15 W to 10 W.

FIG. 21 illustrates a (full) packet format transmitted by the power transmitter according to an embodiment of the present invention.

FIG. 22 illustrates a response packet format transmitted by the power receiver according to an embodiment of the present invention.

FIG. 23 is a flowchart regarding a power transmission method of a wireless power transmitter according to an embodiment of the present invention.

BEST MODE

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

FIG. 1 illustrates an embodiment of various electronic devices into which a wireless charging system is introduced. In FIG. 1, electronic devices are classified according to an amount of power transmitted and received in the wireless charging system.

Low power (approximately 5 W or less or approximately 20 W or less) wireless charging may be applied to wearable devices such as a smart clock and smart glass and mobile/portable electronic devices such as an earphone, a remote controller, a smart phone, PDA, a tablet PC, etc. Medium power (approximately 50 W or less or approximately 200 W or less) may be applied to medium and small appliances such as notebook computers, robot cleaners, TVs, sound devices, cleaners, monitors, and the like. In addition, large power (approximately 2 kW or less or 22 kW or less) wireless charging may be applied to kitchen appliances such as a blender, a microwave oven, and an electric rice cooker, personal mobile devices such as a wheelchair, an electric kickboard, an electric bicycle, and an electronic device/moving means such as an electric vehicle, etc. The electronic devices/moving means illustrated in FIG. 1 may include a power receiver to be described below.

Hereinafter, a low power and a mobile device will be mainly described, but this relates to an embodiment, and the wireless power transmission/reception method according to the present invention may be applied to various electronic devices described above.

Wireless Power Consortium (WPC) standardizes wireless power transmission/reception related technology for standardization of wireless power transmission/reception devices.

The recently developed wireless charging system may support low power transmission and reception up to approximately 5 W. However, recently, a size of a mobile device becomes large and a battery capacity also increases, in the case of such a low power charging system, there is a problem in that a charging time is long and efficiency is lowered, and as a result, a wireless charging system for supporting medium power transmission and reception of up to approximately 15 W to 20 W. At the same time, a wireless charging system having a resonance method added to charge a plurality of electronic devices has also been developed. The present invention relates to a wireless charging system having a resonance method added and intends to propose a resonance type wireless charging transmitter/receiver that is compatible with a low-power/medium-power induction-type wireless charging transmitter/receiver.

Hereinafter, the inductive and resonant wireless charging transmitter and wireless charging receiver proposed by the present invention and a charging method and a communication protocol using the same will be described. Further, hereinafter, a resonance type/mode may be referred to as a shard type/mode. In addition, hereinafter, the wireless power transmitter may be referred to as a power transmitter or transmitter and the wireless power receiver may be referred to as a power receiver or receiver.

FIG. 2 illustrates a wireless power transmission/reception system according to an embodiment of the present invention.

In FIG. 2, the wireless power transmission/reception system includes a mobile device and a base station that receive power wirelessly.

The mobile device includes a power receiver that receives wireless power through a secondary coil and a load that receives and stores the power received by the power receiver and supplies the received and stored power to a device. In addition, the power receiver may include a power pick-up unit that receives a wireless power signal communication and converts the received wireless power signal into electric energy through the secondary coil and a communications and control unit that controls communication and power signal transmission/reception (power transfer/reception) with the power transmitter. The mobile device may also be referred to below as a power reception device.

The base station as an apparatus that provides inductive power or resonant power may include one or more power transmitters and system units. The power transmitter may transmit the inductive/resonant power and control power transmission. The power transmitter may include a power conversion unit that generates a magnetic field through a primary coil(s) and converts/transmits the electric energy into a power signal and a communications and control unit that controls communication and power transfer with the power receiver so as to transmit the power at an appropriate level. The system unit may perform other operation controls such as input power provisioning, control of a plurality of power transmitters, and user interface control. The base station may also be referred to below as a power transmission device.

The power transmitter may control transmission power by controlling an operating point. The controlled operating point may correspond to a combination of a frequency, a duty cycle, and a voltage amplitude. The power transmitter may control the transmitted power by adjusting at least one of the frequency, the duty cycle/duty ratio, and an amplitude of input voltage. Further, the power transmitter may supply constant power and the power receiver may control the received power by controlling a resonant frequency.

A coil or coil portion may hereinafter be referred to as a coil assembly, a coil cell, or a cell, including the coil and at least one element adjacent to the coil.

Inductive Mode—Low Power and Mid Power

Hereinafter, a power transfer method of the power transmitter/receiver operating in the inductive mode will be described first. However, at least one of a method for describing the inductive mode or phases included in the method may be used selectively or optionally in the resonant mode.

FIG. 3 is a block diagram illustrating a power transmission/reception method in an inductive mode.

In the wireless charging system according to the present invention, the wireless charging may be performed through five phases. The five phases may include a selection phase, a ping phase, an identification and configuration phase, a negotiation phase, and a power transfer phase and however, the negotiation phase may be omitted in the low power-mode power transmission/reception. That is, in the lower power mode, the power transmission/reception may be performed by four phases and in the intermediate power mode, the negotiation phase may be additionally performed.

In the selection phase, the power transmitter monitors contact/departure of an object with respect to an interface surface provided in the transmitter. As shown in FIG. 2, the wireless power transmitter may sense the contact of an external object by applying the power signal. In other words, the power transmitter applies a short power signal to the primary coil and senses the current of the primary coil generated by the power signal to monitor the presence of the external object. In addition, when the power transmitter receives signal strength information (packet) monitored in the selection phase and detects the object based on the received signal strength information (packet), the power transmitter may select whether the object is the power receiver or a simple external object (a key, a coin, etc.). For such a selection, the power transmitter may further perform at least one of the following phases: the ping phase, the identification/configuration phase, and the negotiation phase.

In the ping phase, the power transmitter may perform digital ping and wait for the response of the power receiver. The digital ping represents the application/transmission of the power signal to detect and identify the power receiver. When the power transmitter finds the power receiver, the power transmitter may extend the digital ping to proceed to the identification/configuration phase.

In the identification/configuration phase, the power transmitter may identify the selected power receiver and obtain configuration information of the power receiver, such as a maximum power amount. In other words, the power transmitter may receive the identification/configuration information, obtain information on the power receiver, and use the information to establish a power transfer contract. This power transfer contract may include constraints on a plurality of parameters that characterize power transfer in a subsequent power transfer phase.

In the negotiation phase, the power receiver may negotiate with the power transmitter to create an additional power transfer contract. In other words, the power transmitter may receive a negotiation request/information from the power receiver and the negotiation phase may be performed only if a target receiver is identified as an intermediate power receiver in the identification/configuration phase. In the negotiation phase, additional parameters such as the guaranteed power level of the power transmitter and the maximum power of the power receiver may be negotiated. When the power receiver is a low-power receiver, the negotiation phase may be omitted and the identification/configuration phase may directly proceed to the power transfer phase.

In the power transfer phase, the power transmitter provides power wirelessly to the power receiver. The power transmitter receives control data for transmitted power to control power transfer accordingly. In addition, when restrictions of the parameters depending on the power transfer contract are violated during the power transfer, the power transmitter may stop the power transfer and proceed to the selection phase.

FIG. 4 illustrates a power transfer control method in the inductive mode.

In FIG. 4, each of the power transmitter and the power receiver may include a power conversion unit and a power pickup unit, respectively, as illustrated in FIG. 1.

In the power transfer phase of the inductive mode described above, the power transmitter and the power receiver may control the amount of power transferred by parallel communication with power transmission and reception. The power transmitter and the power receiver operate at a specific control point. The control point represents a combination of voltage and current provided at an output of the power receiver when the power transfer is performed.

In more detail, the power receiver selects a desired control point—desired output current/voltage, a temperature of a specific location of the mobile device, etc., and determines an actual control point which currently operates at present.

The power receiver may calculate a control error value by using the desired control point and the actual control point and transmit the control error value as a control error packet to the power transmitter.

In addition, the power transmitter sets/controls a new operating point—the amplitude, the frequency, and the duty cycle—by using the received control error packet to control the power transfer. Accordingly, the control error packet is transmitted/received at a predetermined time interval in the power transfer phase and as the embodiment, the power receiver may set and transmit a control error value as a negative value in the case of intending to decrease the current of the power transmitter and set and transmit the control error value as a positive value in the case of intending to increase the current. As described above, in the inductive mode, the power receiver transmits the control error packet to the power transmitter to control the power transfer.

The resonance mode to be described below may operate in a different manner from that in the inductive mode. In the resonant mode, one power transmitter needs to be able to charge a plurality of power receivers simultaneously. However, in the case of controlling the power transfer as in the inductive mode described above, the power to be transferred is controlled by communication with one power receiver, and as a result, it may be difficult to control the power transfer for additional power receivers. Therefore, in the resonant mode of the present invention, a method is to be used, in which the power transmitter commonly transfers basic power and the power receiver controls a resonant frequency thereof to control the amount of received power. However, the method described in FIG. 4 is not completely excluded in the operation of the resonant mode and additional transmission power may be controlled by the method of FIG. 4.

Shared Mode (Resonant Mode)

FIG. 5 illustrates a power transmission device according to an embodiment of the present invention.

In FIG. 5, the power transmission device may include at least one of a cover covering a coil assembly, a power adapter supplying power to the power transmitter, a power transmitter transmitting wireless power, or a user interface providing power transfer progress and other pertinent information. In particular, the user interface may be optionally included or may be included as another user interface of the power transmission device.

The power transmitter may include at least one of the coil assembly, a tank circuit (or impedance matching circuit), an inverter, a communication unit or a control unit.

The coil assembly includes at least one primary coil that generates the magnetic field and may be referred to as a coil cell.

The impedance matching circuit may provide impedance matching between the inverter and the primary coil(s). The impedance matching circuit may cause resonance at a suitable frequency to boost primary coil current. The impedance matching circuit in a multi-coil power transmitter may further include a multiplexer that routes a signal from the inverter to a subset of the primary coils. The impedance matching circuit may be referred to as a tank circuit.

The inverter may convert a DC input signal into an AC signal. The inverter may be driven as a half-bridge or full-bridge to produce a pulse wave and the duty cycle of an adjustable frequency. Further, the inverter may include a plurality of stages so as to adjust an input voltage level.

The communication unit may perform communication with the power receiver. The power receiver performs load modulation to communicate a request and information for the power transmitter. Thus, the power transmitter may monitor an amplitude and/or a phase of current and/or voltage of the primary coil in order to demodulate data transmitted by the power receiver by using the communication unit. Further, the power transmitter may control output power to transmit data using a frequency shift keying (FSK) method or the like through the communication unit. To this end, a wireless charger may additionally include a current sensor to detect the receiver by detecting a current change of the primary coil, and to detect the transmitted data of the detected receiver.

The control unit may control communication and power transfer of the power transmitter. The control unit may control power transmission by adjusting the operating point. The operating point may be determined, for example, by at least one of an operating frequency, the duty cycle, and an input voltage.

The communication unit and the control unit may be provided as a separate unit/element/chipset or may be provided as one unit/element/chipset as illustrated in FIG. 1.

FIG. 6 illustrates a power reception device according to an embodiment of the present invention.

In FIG. 6, the power reception device may include at least one of a user interface that provides power transfer progress and other pertinent information, a power receiver that receives wireless power, a load circuit, or a base that supports and covers the coil assembly. In particular, the user interface may be optionally included or may be included as another user interface of the power transmission device.

The power receiver may include at least one of the power converter, the tank circuit (or impedance matching circuit), the coil assembly, the communication unit, and the control unit.

The power converter may convert AC power received from the secondary coil to voltage and current suitable for the load circuit. As the embodiment, the power converter may include a rectifier. Additionally, the power converter may adapt reflected impedance of the power receiver.

The impedance matching circuit may provide impedance matching between a combination of the power converter and the load circuit and the secondary coil. As the embodiment, the impedance matching circuit may cause resonance in the vicinity of 100 kHz which may enhance the power transfer.

The coil assembly may include at least one secondary coil and optically further include an element that shields a metal portion of the receiver from the magnetic field.

The communication unit may perform load modulation for communication of the request and other information to the power transmitter. To this end, the power receiver may switch a resistor and a capacitor so as to change reflection impedance.

The control unit may control reception power. To this end, the control unit may determine/calculate a difference between an actual operating point of the power receiver and a desired operating point. In addition, the control unit may adjust/reduce the difference between the actual operating point and the desired operating point by requesting adjustment of the reflection impedance of the power transmitter and/or adjustment of the operating point of the power transmitter. When the difference is minimized, optimal power reception may be performed.

The communication unit and the control unit may be provided as a separate element/chipset or may be provided as one element/chipset as illustrated in FIG. 1.

In the shared mode, the power transmitter needs to manage an exchange of information with one or more power receivers. To this end, the power transmitter provides a structure for communication with the power receiver and such a structure is the same as a communication frame described below.

In FIG. 7, the power transmitter provides a structure that provides a sequence of time slots in which each power receiver may transmit data packets. A sync pattern illustrated in FIG. 7 is provided between the respective slots. The sync pattern serves not only to separate the slots, but also to optimize the communication of the power receiver. In particular, the sync pattern may provide the receiver with information for collision resolution and guaranteed latency.

FIG. 7 illustrates a frame structure for data communication during power transfer. A shard mode protocol may use two types of frames, i.e., a slotted frame and a free-format frame. The slotted frame may be used for the power receiver to transmit short data packets to the power transmitter and the free-format frame may be used for other purposes such as bi-directional larger data packet transmission and coil selection in the multi-coil transmitter.

All frames start with the sync pattern and a measurement slot and the measurement slot may be used to measure the transmission power and the reception power. As the embodiment, 9 slots may be included in one slotted frame. For the free-format frame, there are no specific format restriction beyond the sync pattern and the measurement frame. A start bit (information) of a sync packet may indicate the start of the frame.

FIG. 8 is a diagram illustrating a sync packet according to an embodiment of the present invention.

As illustrated in FIG. 8, the sync packet may include at least one of a preamble, a start bit, a response field, a type field, an Info field, and a parity bit.

The preamble includes a sequence of bits set to one. The number of bits involved may vary depending on the operating frequency. The start bit may be set to zero. The parity bit is a last bit of the sync pattern, and may be set to 1 when the bits set to 1 included in the data fields included in the sync pattern are even and to 0 otherwise.

The response field may include a response of the transmitter to communication from the receiver in a preceding slot. 00 may indicate non-acknowledge regarding that the communication may not be detected, 01 may indicate not-acknowledge regarding that a communication error is detected, and 10 may indicate not-acknowledge regarding that the communication is correctly received, and 11 may indicate acknowledge regarding that the communication is correctly received.

The type field may be set to 1 for a first sync pattern included in the frame and may be set to 0 for other sync patterns.

The Info field has a different value and meaning according to the sync pattern indicated in the sync field. First, when the type field is 1, the info field may indicate whether the frame is the slotted frame or the free-format frame. In addition, when the type field is 0, the Info field may indicate whether a next slot is a slot allocated to a specific receiver, a slot temporarily provided to a specific receiver, or a free slot which may be used by any receiver.

FIG. 9 is a diagram illustrating a power transmission method in a shared mode.

In the shared mode, the power transfer method may include a selection phase, an introduction phase, a configuration phase, a negotiation phase, and a power transfer phase.

The selection phase may represent a selection phase in the inductive mode illustrated in FIG. 3 and in the shared mode, the selection phase may be omitted and the remaining four phases may be described. In the shared mode, if the presence of frequency shift keying (FSK) in the power signal is detected before the wake-up timeout, the process may proceed directly to the introduction phase.

In the introduction phase, the power receiver may request a free slot to transmit control information (CI) packets to use in the next phases. To this end, the receiver transmits an initial CI packet. When the power transmitter responds with the ACK, the power receiver may proceed to the configuration phase. When the power transmitter responds with the NAK, another receiver may perform the configuration phase or the negotiation phase. Therefore, the receiver may request the free slot again. When the receiver receives the ACK, the receiver may determine a private slot thereof in the frame and thereafter, transmit the CI packet b using the slot at the corresponding location.

In the configuration phase, the power transmitter may provide a series of locked slots for exclusive use of the power receiver. This is for the receiver to perform the configuration phase without a collision. The receiver may transmit two identification data packets (IDHI and IDLO), and optionally at least one proprietary data packets, and a configuration packet (CFG) using the locked slots. Upon completing such a phase, the receiver may proceed to the negotiation phase.

In the negotiation phase, the transmitter may also continuously provide the locked slots for exclusive use of the receiver. This is also for the receiver to perform the negotiation phase without the collision. The receiver uses the locked slots to transmit negotiation data packets (including a specific request (SRQ) and a general request (GRQ)) and at least one optional proprietary data packet. Then, the receiver may terminate the negotiation phase by transmitting an SRQ/en (SRQ/end-negotiation) packet. When such a phase is terminated, the transmitter proceeds to the power transfer phase and the transmitter stops providing the locked slots.

In the power transfer phase, the receiver transmits the CI packet using the allocated slot. The, the receiver receives the power. The power receiver may include a regulator circuit. The regulator circuit may be included in the communications and control unit. The receiver may self-regulate the reflection impedance of the receiver through the regulator circuit. That is, the receiver may adjust the reflection impedance so as to transfer the amount of power required for a external load and prevent reception of excessive power or overheat. In the shared mode, the transmitter may not adjust the power corresponding to the received CI packet according to the operation mode, so that it is possible to control preventing an over-voltage situation in this case.

Foreign Object Detection (FOD) Extensions

Hereinafter, FOD extension for detecting a foreign object that is not a wireless charging object in performing the power transmission/reception/control method in the inductive mode described above with reference to FIGS. 3 and 4 will be described. This FOD extension may be performed in such a manner that the negotiation phase, a calibration phase, and a renegotiation phase are added to a basic system control method, as illustrated in FIG. 10. The newly added phases may mainly perform a function for detecting the foreign object.

FIG. 10 is a diagram illustrating a method for controlling a wireless power transmission/reception system to which FOD extension is applied according to an embodiment of the present invention. The description of each phase described above with reference to FIGS. 3 and 4 may be applied in the same or similar manner and hereinafter, differences from FIGS. 3 and 4 will be mainly described, and duplicated description will be omitted.

Referring to FIG. 10, in the selection phase, the power transmitter may monitor an interface surface and monitor the placement and removal of objects using small measurement signals. This measurement signal should not wake up the power receiver located on the interface surface. When the power transmitter senses the foreign object on the interface surface, the power transmitter needs to remain in the selection phase and should not provide the power signal to prevent overheating of the foreign object.

In the negotiation phase, the power receiver may negotiate with the power transmitter to minutely adjust the power transfer contract. To this end, the power receiver may send a negotiation request to the power transmitter which the power transmitter may accept or reject. In addition, to improve a capability of an initial evaluation of the presence of the foreign object, the power transmitter may compare a quality factor reported by the power receiver with a measurement value (or signal) thereof. When the power transmitter detects the foreign object, the process needs to return to the selection phase.

In the calibration phase, the power transmitter may enhance a capability to detect the foreign object during power transmission. In particular, the power transmitter may adjust parameters of a power loss method. Here, the power receiver may provide the reception power thereof under two load conditions.

In the power transfer phase, the power transmitter may continually check whether a new foreign object is placed on the interface surface. To this end, the power transmitter may use an FOD power loss method based on, for example, a calibrated power loss calculation. The power receiver may also check the placement of the new foreign object. When the power transmitter or power receiver detects the foreign object, the power transmitter and/or the power receiver must reduce the power signal or remove the power signal and return to the selection phase.

In the renegotiation phase, the power transmitter may adjust the power transfer contract when desired. If necessary, the renegotiation phase may be terminated prematurely without changing the power transfer contract.

In the calibration phase, the power transmitter needs to receive from the power receiver information which the power transmitter will use to improve the power loss method for the FOD. In particular, the power transmitter needs to receive received power information from the power receiver and the power receiver at this time transmits the received power information at a light load (disconnected load) and a connected load. If the power transmitter does not receive such received power information, the power transmitter may remove the power signal and return to the selection phase. However, the power transmitter may attempt to improve the power loss method by using the received power information only when it is confirmed that there is no foreign object.

The operation of the power transmitter in the calibration phase may be the same as the operation in the power transfer phase, but the following operations may be added.

If the power transmitter receives a 24-bit received power packet with the mode field set to '001' (calibration mode for the light load) and if the received power value is met, the power transmitter may transmit an ACK response. Otherwise, the power transmitter may transmit an NAK response.

If the power transmitter receives a 24-bit received power packet with the mode field set to '010' (calibration mode for the connected load) and if the received power value is met, the power transmitter may transmit the ACK response and continuously perform the power transfer phase. Otherwise, the power transmitter may transmit the NAK response.

Here, the received power packet (RPP) may correspond to a packet transmitted to the power transmitter at least once by the power receiver in the negotiation phase in order to change the format of the received power packet determined in the power transfer contract. When the power transmitter transmits the ACK response to the received power packet, the format of the received power packet in a provisional power transfer contract may be changed based on the received power packet in which the ACK response is transmitted.

In the power transfer phase of a system that supports the FOD extension, the power transmitter may perform the following operations.

FIG. 11 is a diagram illustrating a response timing of a power transmitter for a reception power packet according to an embodiment of the present invention.

If the power transmitter receives a renegotiate Packet, the power transmitter may transmit the ACK response and then proceed with the renegotiation phase.

If the power transmitter receives a received power packet in a format different from the agreed format in the power transfer contract, the power transmitter may remove the power signal and return to the selection phase.

If the power transmitter receives the 24-bit received power packet with the mode field set to '000' (calibration mode for the light load), the power transmitter needs to transmit the response within t_response from the time when the received power packet is transmitted/received as illustrated in FIG. 11. When the power transmitter determines that the power transfer may be performed in a current state, the power transmitter may transmit the ACK response indicating that the power transfer may be performed in the current state to the power receiver. Alternatively, when the power transmitter determines that the power receiver needs to reduce power consumption, the power transmitter may transmit the NAK response indicating that the power receiver needs to reduce power consumption to the power receiver. In particular, the power transmitter may transmit the NAK response in the following cases.

1) a case where the foreign object is located in the magnetic field 2) a case where a surrounding temperature is high, and as a result, a current power level may not be continuously supported 3) a case where operating close to a limit or exceeding the limit due to a low coupling condition, etc.

When the power transmitter sends the NAK response, the power transmitter may continuously transmit the power to the power receiver so as for the power receiver to reduce the power consumption. After a few NAK responses are transmitted successively without a sufficient decrease in power level being detected, the power transmitter needs to terminate the power transmission.

The power receiver that receives the NAK response may either reduce the power consumption thereof or transmit an end power packet with an end power transfer code set to 0x0B (power transfer restart), or induce a user to solve a reason whey the power transmitter sends the NAK response.

The power receiver may retrieve a power transmitter capability packet to determine how much power consumption level to reduce.

If the power receiver does not retrieve the response after the received power packet (e.g., if the received power packet with the mode field set to '100' is transmitted), the power transmitter may not request the power receiver to reduce the power consumption. Therefore, the power receiver needs to always be prepared for power reduction triggered by a possible power transmitter at any time.

If the power transmitter receives a received power packet with the mode field set to '001' or '010', the power receiver may ignore a received power value and transmit a not-defined (ND) response.

If the power transmitter receives the end power transfer packet including the end power transfer code of 0x0B (power transfer restart), the power transmitter may remove the power signal, attempt to detect the presence of the foreign object, and continuously perform the ping phase within t_restart (=500 ms).

As such, the power transmitter may transmit the ACK/NAK/ND response for a specific packet transmitted by the power receiver and the embodiment of FIG. 12 may exist as the format of the response.

FIG. 12 is a diagram illustrating a response format of the power transmitter according to an embodiment of the present invention.

Referring to FIG. 12, a power transmitter response format may be implemented with an 8-bit size bit pattern. In particular, the ACK response indicating the request accept may be configured by a '11111111' bit pattern format, the NAK response indicating the request reject may be configured by a '00000000' bit pattern format, and the ND response indicating that the request is unrecognizable or invalid may be configured by a '01010101' bit pattern format. However, this is merely an example and may be configured with various bit patterns.

Since a sender or a master that initiates/leads communication in a communication protocol between a power transmitter and a power receiver defined in a current WPC standard is the power receiver, the power transmitter may transmit only a response to a request of the power receiver, and as a result, the power transmitter may not detect foreign objects in a charge region (or a magnetic field region) or may not reduce a power level directly at a desired timing even though a current charging environment is changed and the power level adjustment is thus required. Therefore, as described above in the WPC standard, when the foreign object is detected in the power transfer phase (or when it is confirmed that the foreign object is located in the magnetic field/a charging region) of transmitting power, the power transmitter is defined to transmit the NAK response to the received power packet transmitted by the power receiver to induce the power receiver to reduce the received power level. A solution to inform the power receiver of the detection of the foreign object by using the NAK response to induce the power receiver to reduce the power level may be referred to as a 'short-term solution'.

Such a short-term solution has the following disadvantage.

First, the meaning of the NAK response may become ambiguous. Namely, in accordance with the short-term solution described above, the NAK response additionally has a meaning of an implicit request for power renegotiation (or an implicit meaning indicting reduction of the foreign object/reduction of the power level) in addition to an already defined meaning of rejecting the power receiver, the meaning of the NAK response is multiplexed to confuse the operation of the power receiver based on the NAK response.

Further, since the power transmitter may transmit the NAK response to the power receiver only when the received power packet with the mode field set to '000' is transmitted, a time when the power level is able to be adjusted depending on the detection of the foreign object is limited to a specific time. In particular, since the power receiver does not expect any response from the power transmitter for the received power packet with the mode field set to '100', the power transmitter may not transmit the NAK response for reducing the power level when receiving the received power packet with the mode field set to '100'. In this case, the power transmitter needs to delay transmission of the NAK response for reducing the power level until the received power packet with the mode field set to '000' is transmitted. As a result, the power is continuously transmitted to the foreign object, which may cause a risk such as fire or the like.

Further, according to the short-term solution, there is a disadvantage that flexibility deteriorates in adjusting the power level.

FIG. 13 illustrates a power management profile of the power transmitter according to an embodiment of the present invention.

In the short-term solution, the power receiver may assume that the reduction of the power level is required due to the detection of the foreign object or a surrounding environment of the power transmitter. In particular, if 5 W is received from the power transmitter, the power receiver may stop receiving the power after receiving the NAK response. However, such a short-term solution does not provide a clear way to increase the power level again, even in a case where the reduced power level needs to increase again, such as a case where a charging condition of the power transmitter is enhanced or the foreign object is removed.

Therefore, in the present specification, a problem of the short-term solution described above is prevented, and a method of adjusting the power level according to the detection of the foreign object is proposed more efficiently. In particular, in the present specification, proposed are various methods in which the power transmitter acts as a master/sender to resume/initiate/lead communication with the power receiver to immediately/efficiently adjust the power level according to a situation.

Method for Detecting Foreign Objects and Adjusting Power Level According to Change of Charging Environment Proposal A. Definition of New Bit Pattern for Request for Renegotiation (RFR)

In one embodiment, a new bit pattern RFR may be defined to request renegotiation to a power receiver by a power transmitter, and the power transmitter may request power renegotiation to the power receiver by transmitting the RFR to the power receiver. The RFR may be constituted by a bit pattern having an 8-bit size and may be defined as various bit patterns having a 8-bit size except for the bit pattern defined for an ACK/NAK/ND response in the standard. For example, the RFR may be defined as '00001111', '11110000', '10101010', '10110110', '00110011', or '01001001'. However, in order to classify a bit pattern only by bit decoding, it may be preferable to define an RFR so that bit patterns can be distinguished even if only 3 bits are decoded.

The newly defined RFR may be used to indicate a transmission power renegotiation request. The power receiver receiving the RFR may transmit a renegotiation packet to the power transmitter and the power transmitter may transmit an ACK/NAK/ND response to the renegotiation packet. If the power transmitter transmits an ACK response, the power transmitter and power receiver may enter a renegotiation phase.

In the renegotiation phase, the power receiver may inquire guaranteed power (GP) of the power transmitter, and the power transmitter may respond to the power level providable to the current power receiver as a GP in response thereto. If the power receiver requests the corresponding GP to the power transmitter via a specific request packet, the power transmitter may transmit an ACK response thereto to make a new power contract with the power receiver.

As a specific example, it may be assumed that the power transmitter and the power receiver make a power transmission contact to a level of 15 W to enter into a power transmission phase. In the power transmission phase, while the power transmitter transmits power (alternatively, while the power receiver is charged), if the power transmitter detects errors in other surrounding environments, such as rising of a temperature or detection of foreign objects, to down-grade the GP from 15 W to 10 W, the power transmitter may transmit the RFR as a response to a received power packet of the power receiver. The power receiver receiving the RFR may transmit a renegotiation packet requesting power contract renegotiation to the power transmitter and the power transmitter may enter the renegotiation phase by transmitting an ACK response thereto. In the renegotiation phase, the power transmitter and the power receiver may re-make a power contract with a new GP level of 10 W, which is desired by the power transmitter.

FIG. 14 illustrates a communication protocol between the power transmitter and the power receiver depending on proposal A of the present invention. Particularly, FIG. 14A illustrates a communication protocol when the power transmitter receives a received power packet RPP and FIG. 14B illustrates a communication protocol when the power transmitter receives a control error (CE) packet. Here, the control error packet represents a specific packet used to control an operation point of the power transmitter. In the drawing, boxes indicated by hatching represent phases performed by the power transmitter and other boxes represent phases performed by the power receiver, respectively.

Referring to FIG. 14, the power receiver may first transmit an RPP or CE packet to the power transmitter. At this time, if the power transmitter determines that there is a need to change the power transmission contract with the power receiver in the negotiation phase according to the current situation detected by the power transmitter (alternatively, there is a need to change/adjust the GP level), the power transmitter may transmit an RFR requesting entering into the renegotiation phase to the power receiver. The power receiver may enter into a renegotiation phase to adjust/change the GP level with the power transmitter by transmitting a renegotiation packet to the power transmitter.

In the renegotiation phase, the power receiver may transmit a general request (GRQ)/cap packet to the power transmitter so as to receive a capability packet of the power transmitter including maximum GP level information that is currently transmittable by the power transmitter. In response to the GRQ/cap packet, the power transmitter may transmit a power transmitter capability (PTC) packet including its own power transmission capability information to the power receiver. The PTC packet may include, as the power transmission capability information, power class information of the power transmitter, (maximum/new) GP level information of the power transmitter determined in consideration of the current surrounding situation/condition, and/or (maximum/new) GP level information of the power transmitter transmittable in an ideal surrounding situation/condition.

As a response to the PTC packet, the power receiver may transmit an SRQ/gp packet containing the GP level information requested by the power receiver to the power transmitter. Such an SRQ/gp packet may correspond to an SRQ packet whose a request parameter field is set to indicate a 'guaranteed power value' and may be defined to indicate a GP level desired/requested by the power receiver in units of 0.5 W.

If such a SRQ/gp packet accommodates the GP level desired/requested by the power receiver, the power transmitter may transmit an ACK response as a response to the SRQ/gp packet.

As a response to such an ACK response, the power receiver may transmit an SRQ/en packet indicating the end of the (re)negotiation phase to the power transmitter. The SRQ/en packet may correspond to an SRQ packet in which a 'change count' is set in the request parameter field. The power transmitter may terminate the negotiation/renegotiation phase of the power transmission/reception period by transmitting an ACK signal if the change count value calculated by the power transmitter after receiving the SRQ/en packet is matched with the change count value stored in the SRQ/en. Furthermore, in order to transmit and receive the power at the negotiated GP level in the negotiation/renegotiation phase, the power transmitter and the power receiver may enter into the power transmission phase.

In order to successfully terminate the negotiation/renegotiation phase, the differential parameter count values calculated by the power transmitter and the power receiver in the negotiation/renegotiation phase, respectively, need to match each other. More specifically, if the power transmitter did not transmit an ACK response for both a SRQ packet and a FOD status packet with a request value set to 0x02 (i.e., the received power packet type) at the beginning of the negotiation/renegotiation phase, the phase needs to return to a selection phase.

Otherwise, the power transmitter needs to verify whether the change count value received through the SRQ packet matches the number of different parameters between an effective power transmission contract and a temporary power transmission contract. When the two values match each other, the power transmitter sends the ACK response. Thereafter, the power transmitter may copy the temporary power transmission contract to the effective power transmission contract and proceed to a calibration phase. Otherwise, the power transmitter may copy the effective power transmission contract to the temporary power transmission contract, transmit a NAK response, and maintain the negotiation/renegotiation phase.

FIG. 15 is a diagram illustrating a power management profile of the power transmitter depending on proposal A of the present invention.

According to proposal A, the power transmitter has an effect of dynamically adjusting the GP appropriately at a desired time, depending on the situation. In particular, in the short-term solution described above, only the decrease of the GP level was possible, but in the case of proposal A, an effect of not only decreasing but also increasing the GP level is made. As a result, the power transmitter of proposal A has an advantage that a more flexible power management profile may be implemented according to the present charging condition as shown in FIG. 15.

Proposal B: Definition of New Bit Pattern for Request for Communication (RFC) or Request for Sender (RFS)

In another embodiment, a new bit pattern RFC or RFS for requesting communication with the power receiver (alternatively, requesting acceptance of status acquisition as a master/sender to resume/initiate/lead communication) may be defined, and the power transmitter may resume/initiate the communication with the power receiver by transmitting the RFC or RFS to the power receiver. The RFR or RFS may be constituted by a bit pattern having an 8-bit size and may be defined as various bit patterns having a 8-bit size except for the bit pattern defined for an ACK/NAK/ND response in the standard. For example, the RFR or RFS may be defined as '00001111', '11110000', '10101010', '10110110', '00110011', or '01001001'.

Such a proposal B has an effect of providing an extended Qi protocol by allowing full packet transmission of the power transmitter without collision with the Qi communication protocol pre-defined in the WPC standard.

When describing a specific communication protocol according to proposal B, the power transmitter may first transmit an RFC or RFS to the power receiver as a response to a specific packet (e.g., a CE or RPP packet). The transmission of such an RFC or RFS may be interpreted to a meaning of requiring the acceptance of the status/authority acquisition as the master/sender capable of transmitting (positively) the (full) packets. That is, when the power transmitter desires to acquire the status/authority acquisition as the master/sender capable of transmitting the (full) packets (alternatively, initiating transmission of packets) from the power receiver. The power receiver may transmit an ACK response to the power transmitter as a response to the RFC or RFS when accepting the authority acquisition for the (full) power transmission of the power transmitter. The power transmitter receiving this ACK response may transmit the (full) packet to the power receiver. The power receiver may transmit an ACK/NAK/ND or a specific packet requested by the power transmitter in response to the received (full) packet.

The communication protocol with the power receiver initiated/led by the power transmitter may be terminated when the power receiver receives a NAK or ND response, or there are no more packets to be transmitted to the power receiver.

As such, the power transmitter may resume/initiate/lead communication with the power receiver using the RFC or RFS. Therefore, if the power transmitter needs to change the power transmission contract pre-made with the power receiver depending on the surrounding environment, such as detection of foreign objects, the power transmitter acquires the status/authority as the master/sender using the RFC or RFS and transmits (positively) the (full) packets to the power receiver, thereby efficiently negotiate/adjust the (full) packets.

FIG. 16 illustrates a communication protocol between the power transmitter and the power receiver depending on proposal B of the present invention. In the drawing, boxes indicated by hatching represent phases performed by the power transmitter and other boxes represent phases performed by the power receiver, respectively. The description of each phase described above with reference to FIG. 14 may be equally applied in connection with the drawing, and hereinafter, differences from FIG. 14 will be mainly described, and duplicated description will be omitted.

Referring to FIG. 16, the power transmitter may receive a CE (or RPP) packet from the power receiver and transmit an RFC or RFS to the power receiver as a response thereto. If the power receiver accepts the request according to the RFC or RFS, the power receiver may transmit an ACK packet to the power transmitter. Next, the power transmitter may transmit a PTC packet containing its own power transmission capability information to the power receiver, and enter/return to the negotiation/renegotiation phase with the power receiver. The description related to packet transmission/reception in the negotiation/renegotiation phase is as described above with reference to FIG. 14.

Proposal C. Definition of New Bit Pattern for Request for Communication (RFC) or Request for Sender (RFS) Combined With ACK/NAK/ND Response As another example, a proposal C may be proposed to newly propose an RFC or RFS in the form combined with an ACK/NAK/ND response. Here, the RFC or RFS denotes a new bit pattern for requesting communication described in proposal B above (alternatively, requesting acceptance of status acquisition as a master/sender to resume/initiate/lead communication). However, the RFC or RFS in the present embodiment may be defined in the form combined with the ACK/NAK/ND response and may be defined in the form of a joint-encoded bit pattern, unlike the proposal C. For example, the RFC or RFS combined (or jointly encoded) with an ACK response may perform the function of requesting the status acquisition as the master/sender of the power transmitter while power transmitter accepts the request of the power receiver.

For example, the RFC or RFS in the form combined with the ACK/NAK/ND response may be defined with a new bit pattern as follows:

'11110000': Indicate RFC/RFS combined with ACK response
'00001111': Indicate RFC/RFS combined with NAK response
'01010000': Indicate RFC/RFS combined with ND response
'01011111': Request to release status as master/sender (or indicate termination of communication)

In addition, the RFC or RFS in the form combined with the ACK/NAK/ND response may be signaled/encoded (e.g., tabulated and defined for each content) in various embodiments and may be promised between the power transmitter and the power receiver in advance.

The motivation derived from this proposal is to extend an extended Qi protocol by allowing full packet transmission of the power transmitter without collision with the Qi communication protocol pre-defined in the WPC standard.

In the present embodiment, the power transmitter may transmit an RFC or RFS combined with an ACK/NAK/ND response in response to a specific packet transmitted by the power receiver. Here, the specific packet may mean a predetermined packet which requires or not a response of the power transmitter as follows.

Examples of packets that require response of power transmitter: Specific request packet (SRP) and RPP
Examples of packets that do not require response of power transmitter: CE packet According to the present embodiment, it is possible to support a specific function/application (e.g., an authentication protocol) that requires bilateral communication between the power transmitter and the power receiver.

The communication protocol between the power transmitter and the power receiver according to proposal C will be described in detail as follows. Even in a communication protocol proposed below, it is assumed/required that the power receiver is set as a master/sender that leads communication (alternatively, mainly transmits a full packet) as predefined in the Qi protocol of the WPC standard. Hereinafter, the RFC or RFS combined with the ACK/NAK/ND response will be abbreviated as 'RFC or RFS' for convenience of explanation.

First, if the power transmitter desires to be the master/sender, the power transmitter may request acceptance as the master/sender by transmitting the RFC or RFS to the power receiver. This may be referred to as a collision avoidance mechanism. Specifically, the power transmitter may transmit the RFC or RFS within a corresponding transmission interval/period when a packet (e.g., a CE packet) transmission interval/period is sufficiently long to transmit the RFC or RFS (more than a predetermined time) as the response to the packet requiring the response of the power receiver. In the latter case, there is an effect of preventing a collision between the packet transmitted by the power receiver and the RFC or RFS in advance.

If the transmission interval/period between the packets becomes longer as in the latter case, the case may correspond to a case where the CE packet is mainly transmitted. According to the predefined WPC standard, the power receiver first stabilizes the shaken rectified voltage at the time of entering into the initial power transmission phase and transmits the CE packet in a short period (e.g., 32 ms) to quickly reach an operating point to the power transmitter. That is, the period/interval (less than a predetermined time) at which the CE packet is transmitted (for example, about 32 ms) means that the power transceiver is not in a stabilized state, and the transmission period/interval (more than a predetermined time) of the CE packet (e.g., about 250 ms) which becomes sufficiently longer (for example, about 250 ms) may mean that the power transceiver is in a stabilized state. In the case of accepting the status as master/sender of the power transmitter in an unstable state, confusion in the communication between the power transmitter and the power receiver may be caused, and both the power transmitter and the power receiver may operate unsteadily. Therefore, the power transmitter according to proposal C can transmit the RFS or the RFC to the power receiver within the CE packet transmission interval only after confirming that the power transmitter and the power receiver are stable as the period/interval in which the CE packet is transmitted becomes sufficiently long. It may be interpreted that the packet transmission of the power receiver takes precedence over the packet transmission of the power transmitter, or that the status of the master/sender of the power receiver takes precedence over the master/sender status of the power transmitter. According to the present embodiment, the collision between the RFC or RFS and the CE packet is prevented, and the power transceiver may perform the communication while the power transmitter and the power receiver are stabilized.

Next, if the power receiver accepts the status acquisition as the master/sender of the power transmitter, the power receiver may transmit an ACK response as a response to the RFC or RFS.

The power transmitter receiving the ACK response may transmit various (full) packets for communicating with the power receiver by determining that the power transmitter acquires the status as a master/sender. For example, as described above, a (full) packet including information (for example, power transmission capability information of the power transmitter) for negotiating/renegotiating the power transmission contract pre-made according to the detection of the foreign objects may be positively transmitted to the power receiver.

The power receiver may transmit an ACK/NAK/ND or a specific packet requested by the power transmitter in response to the received (full) packet. The power receiver may transmit an ACK/NAK/ND or a specific packet requested by the power transmitter in response to the received (full) packet.

The communication protocol with the power receiver initiated/led by the power transmitter may be terminated when the power receiver receives a NAK or ND response, or there are no more packets to be transmitted to the power receiver.

In the case where the power receiver is transmitting the CE packet, the size of the RFC, RFS and/or full packet to be transmitted by the power transmitter the interval/period between the CE packets may be determined based on the maximum interval/period between the CE packets. For example, assuming that the maximum interval/period between CE packets is 250 ms, the size of the RFC, RFS, or (full) packet is limited to 4 bytes (B) (=payload 3 B+checksum 1 B).

FIG. 17 illustrates 1 B (byte) data according to an embodiment of the present invention.

Referring to FIG. 17, 1 B data may be added with 3 bits (start, parity and stop bits) to be configured as a size of a total of 11 bits. Accordingly, a bit size of the RFC, RFS or full packet of a size of 4 B may be determined to be a total of 44 bits, and when it is assumed that the transmission time per bit is 5 ms, the transmission time of the RFC, RFS or (full) packet of 44 bits is a total of 220 ms, 250 ms or less.

In other words, the size of the RFC, RFS or (full) packet transmitted by the power transmitter is determined (e.g., 44 bits) to be transmitted within the maximum time interval (e.g., 250 ms) at which the CE packet is transmitted, thereby preventing collision with the CE packet as much as possible.

FIG. 18 illustrates a communication protocol between the power transmitter and the power receiver depending on proposal C of the present invention. In the drawing, boxes indicated by hatching represent phases performed by the power transmitter and other boxes represent phases performed by the power receiver, respectively. The description of each phase described above with reference to FIGS. 14 and 16 may be equally applied in connection with the drawing, and hereinafter, differences from FIGS. 14 and 16 will be mainly described, and duplicated description will be omitted.

Referring to FIG. 18, the power transmitter may receive a RPP (or CE) packet from the power receiver and transmit an RFC or RFS to the power receiver as a response thereto. If the power receiver accepts the request according to the RFC or RFS, the power receiver may transmit an ACK packet to the power transmitter. Next, the power transmitter may transmit a PTC packet containing its own power transmission capability information to the power receiver, and enter/return to the negotiation/renegotiation phase with the power receiver. The description related to packet transmission/reception in the negotiation/renegotiation phase is as described above with reference to FIGS. 14 and 16.

Meanwhile, although not shown in the drawing, as the (full) packet transmitted by the power transmitter after acquiring the status as the master/sender, in addition to the aforementioned PTC, a packet related to authentication may exist. For example, as the packet related to authentication, GET_DIGESTS (a packet for requesting a digest of a certificate chain), GET_CERTIFICATE (a packet for requesting authentication), and CHALLENGE (transmitting a nonce having a size of 32-byte to verify whether the receiver has an encryption key) may be present.

The aforementioned embodiments may be equally applied to the proposal B. For example, the power transmitter of proposal B may transmit the RFC or RFS within a corresponding transmission interval/period when a packet (e.g., a CE packet) transmission interval/period is sufficiently long to transmit the RFC or RFS (more than a predetermined time), as the response to the packet requiring the response. In addition, the power transmitter of proposal B may also lose its status/authority as the master/sender based on the above-mentioned reasons.

FIG. 19 illustrates a flowchart regarding a power transmission/reception method depending on proposal B or C of the present invention. The above-described embodiments may be applied in the same or similar manner with respect to this flowchart, and duplicated description will be omitted. Also, even in the flowchart, as predefined in the Qi protocol of the WPC standard, a PRx-mastered Qi protocol, in which the power receiver is set as the master/sender and positively transmits the full packets such as the CE packet and RPP, is assumed/required.

1. First, when a power transmitter PTx recognizes that there is a specific reason to initiate/lead the communication protocol of the power transmitter (for example, when it either returns to the negotiation/renegotiation phase, such as detection of foreign objects or the reason to newly negotiate the GP level occurs), the power transmitter may transmit an RFC (or RFS) to a power receiver PRx to obtain status/authority as the master/sender. At this time, the RFC (or RFS) may be an RFC (or RFS) in a form combined with an ACK/NAK/ND response.

2. When the power receiver PRx accepts acquisition of the status/authority as the master/sender of the power transmitter PTx, the power receiver PRx may transmit an ACK response and if not, the power receiver PRx may transmit a NAK response.

3. At the time of receiving the ACK response, the power receiver PRx acquires the status/authority as the master/sender so that transmission of the full packet is possible. The full packet transmitted at this time may correspond to a packet (for example, a PCT or a newly defined packet) containing new GP information of the power transmitter PRx in order to renegotiate the GP with the power receiver PRx (alternatively, to change the pre-made power transmission contract). Currently, in the WPC standard, since the power receiver is set as the master/sender, various (full) packet formats which may be transmitted by the power transmitter and packet formats for the response of the power receiver are not be defined. Therefore, various (full) packet formats that may be transmitted by the power transmitter in FIG. 21 and various response packet formats that may be transmitted by the power receiver in FIG. 22 will be described below.

4. The power receiver PRx may transmit an ACK/NAK/ND response or response packet as a response to the received (full) packet. The power receiver PRx may not receive the packet from the power transmitter PTx for a predetermined time or may return to the PRx-mastered Qi protocol, in which the power receiver PRx is the master/sender, after transmitting the NAK/ND response. The power transmitter PTx may receive the NAK/ND response from the power receiver, or terminate the PTx-mastered Qi protocol in which power transmitter PTx is the master/sender when there is no packet to be transmitted any longer, and return to the PRx-mastered Qi protocol. Alternatively, the power transmitter may transmit a next (full) packet when the power transmitter receives an ACK response from the power receiver. The power transmitter may also receive an ACK/NAK/ND response or response packet as a response thereto.

FIG. 20 is a flowchart illustrating an embodiment depending on proposal B or C when the power transmitter downgrades a GP level from 15 W to 10 W. With respect to the flowchart, it is assumed that a GP level is determined as 15 W according to the power transfer contract last concluded between the power transmitter and the power receiver and the current power transmitter is transmitting power to the power receiver at 15 W. Further, the above description related with FIG. 19 may be applied to the flowchart in the same/similar manner and the duplicated description is omitted.

1. First, a power transmitter PTx may recognize a reason for newly negotiating the GP level with the power receiver, such as detecting the foreign object in the charging region, while transmitting the power at the level of 15 W. In this case, the power transmitter may transmit an RFC (or RFS) to a power receiver PRx to obtain a status/authority as the master/sender. In this case, the RFC (or RFS) may be RFC (or RFS) of a form combined with the ACK/NAK/ND response.

2. When the power receiver PRx accepts acquisition of the status/authority as the master/sender of the power transmitter PTx, the power receiver PTx may transmit the ACK response and when rejecting the acquisition, the power receiver PRx may transmit the NAK response.

3. Upon receipt of the ACK response, the power receiver PRx acquires the status/authority as the master/sender so that full packet transmission is possible. The power transmitter PTx may transmit a full packet containing new GP level (e.g., 10 W) information downgraded at 15 W to the power receiver PRx for reasons such as the detection of the foreign object.

4. When the power receiver PRx accepts a newly proposed GP level (e.g., 10 W) through the full packet, the power receiver PRx may transmit the ACK response to the power transmitter PTx. As a result, a power down contract for the downgraded new GP level, which is downgraded may be concluded.

FIG. 21 illustrates a (full) packet format transmitted by the power transmitter according to an embodiment of the present invention. In particular, the (full) packet of FIG. 21 illustrates a GP packet including GP level information in which the power transmitter newly wants to contract with the power receiver.

Referring to FIG. 21, 2 bits of the GP packet may be set to a spare bit (or header, 0x01), and the remaining 6 bits may be set to a field indicating a new GP level requested by the power transmitter. At this time, the field (6 bits) may be defined to indicate the new GP level/value in units of a specific level/value unit (for example, in units of 0.5 W).

The power transmitter may set the field to a specific value by reflecting/considering the current surrounding situation/environment. For example, if the temperature of the power transmitter exceeds a predetermined temperature, the power transmitter may set the field value to a GP level lower than the GP level negotiated in the previous power transfer contract with the power receiver. If the temperature of the power transmitter is lowered to a predetermined temperature or lower depending on the surrounding situation/environment, the power transmitter may again raise the GP level of the corresponding field.

FIG. 22 illustrates a response packet format transmitted by the power receiver according to an embodiment of the present invention.

Referring to FIG. 22, the response packet format of the power receiver may be defined to be the same as/similar to the response packet format of the power transmitter (see FIG. 12). That is, the ACK response indicating the request accept of the power transmitter may be configured by a '11111111' bit pattern format, the NAK response indicating the request reject may be configured by a '00000000' bit pattern format, and the ND response indicating that the request is unrecognizable or invalid may be configured by a '01010101' bit pattern format. However, this is merely an example and may be configured with various bit patterns.

At this time, the header size of the response packet may be set differently for each response type. For example, the header size of the ACK response packet may be set to 0x06, the header size of the NAK response packet may be set to 0x07, and the header size of the ND packet may be set to 0x08.

FIG. 23 is a flowchart regarding a power transmission method of a wireless power transmitter according to an embodiment of the present invention. The above-described embodiments may be applied in the same or similar manner with respect to this flowchart, and duplicated description will be omitted.

First, the power transmitter may perform a selection phase to monitor the placement and removal of objects on the interface surface of the power transmitter (S2310).

Next, the power transmitter may perform digital ping, receive a response from the power receiver, and recognize the placement on the interface surface of the power receiver (S2320).

Next, the power transmitter may acquire configuration information of the power receiver and make a power transmission contract with the power receiver using the configuration information (S2330). At this time, the configuration information may include information on the power reception capability of the power receiver, such as maximum GP level information that is able to be received by the power receiver. The power transmission contract may include GP level information determined by negotiation between the power transmitter and the power receiver.

Next, the power transmitter may transmit a specific level of power to the power receiver based on the established/made power transmission contract with the power receiver (S2340). More specifically, the power transmitter may transmit power to the power receiver at a specific level determined according to GP level information included in the power transmission contract.

Next, the power transmitter may transmit indication information for initiating communication with the power receiver to the power receiver (S2350). This indication information transmission phase may be performed when a foreign object is detected on the interface surface or when an ambient temperature is detected to be higher than a predetermined temperature.

In one embodiment, the indication information may be information requesting initiation of communication with the power receiver to renegotiate the power transmission contract. For example, the indication information may correspond to the RFR described above in regard with proposal A above. If the bit patterns for the ACK response accepting the request of the power receiver included in the predetermined packet, the NAK response rejecting the request, and the ND response indicating that the request is invalid, are defined, respectively, the bit patterns of the indication information may be defined as different patterns from the bit patterns of the ACK response, the NAK response, and the ND response.

Although not shown in a flow chart, the phase of transmitting the power to the power receiver further includes receiving a predetermined packet from the power receiver, in which the indication information may be transmitted to the power receiver as a response to a predetermined packet. Further, the predetermined packet may correspond to a received power packet for changing the format of the received power packet determined in the power transmission contract or a control error packet used for determining an operation point of the power transmitter.

In another embodiment, the indication information may include request information in which the power transmitter requests authority acquisition capable of transmitting a predetermined packet to the power receiver. For example, the indication information may correspond to the RFC or RFS described above. This is as described above in regard with proposal B above. The predetermined packet may include a packet including information on a new guaranteed power level of the power transmitter.

Although not shown in the flowchart, the phase of transmitting the power to the power receiver may include receiving a predetermined packet from the power receiver, wherein the indication information may be transmitted to the power receiver as the response to the predetermined packet or transmitted within the transmission interval if the transmission interval of the predetermined packet is longer than a threshold. Further, the predetermined packet may correspond to a received power packet for changing the format of the received power packet determined in the power transmission contract or a control error packet used for determining an operation point of the power transmitter. When the bit patterns for the ACK response accepting the request of the power receiver included in the predetermined packet, the NAK response rejecting the request, and the ND response indicating that the request is invalid, are defined, respectively, the bit patterns of the indication information may be defined as different patterns from the bit patterns of the ACK response, the NAK response, and the ND response.

When the indication information is transmitted to the power receiver as a response to the predetermined packet, the indication information may further include response information for the predetermined packet in addition to the request information.

This is as described above in regard with proposal C above.

When the indication information is transmitted within the transmission interval of the predetermined packet, the size of the packet carrying the indication information may be determined based on the transmission interval of the predetermined packet. This is as described above in regard with FIG. 17 above.

Although the drawings have been described for the sake of convenience of explanation, it is also possible to design a new embodiment to be implemented by merging the embodiments described in each drawing. Further, configurations and methods of the described embodiments may not be limitedly applied to the aforementioned present invention, but all or some of the respective embodiments may be selectively combined and configured so as to be variously modified.

Further, while the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

MODE FOR INVENTION

Various embodiments are described in a best mode for carrying out the present invention.

INDUSTRIAL APPLICABILITY

The present invention may be applied to various wireless charging technologies.

The invention claimed is:

1. A wireless power transmission method executed by a power transmitter, the method comprising:
   monitoring placement and removal of an object on and from an interface surface of the power transmitter;
   performing digital ping and receiving a response from a power receiver;
   acquiring configuration information of the power receiver and generating a power transfer contract with the power receiver by using the configuration information;
   transmitting power to the power receiver based on the power transfer contract; and
   transmitting indication information for initiating communication with the power receiver to the power receiver,
   wherein the indication information includes request information that the power transmitter requests for the power receiver to acquire an authority to transmit a predetermined packet.

2. The wireless power transmission method of claim 1, wherein the indication information is information for requesting initiation of communication with the power receiver for renegotiating the power transfer contract.

3. The wireless power transmission method of claim 2, wherein the transmitting of the power to the power receiver includes receiving a predetermined packet from the power receiver, and
   wherein the indication information is transmitted to the power receiver as a response to the predetermined packet.

4. The wireless power transmission method of claim 3, when bit patterns are defined for an acknowledge (ACK) response indicating acceptance of the request of the power receiver included in the predetermined packet, a non-acknowledge (NAK) response indicating denial of the request, and a not-defined (ND) response indicating that the request is not valid,
   wherein a bit pattern of the indication information is defined as a different pattern from the bit patterns of the ACK response, the NAK response, and the ND response.

5. The wireless power transmission method of claim 4, wherein the predetermined packet corresponds to a received power packet for changing a format of a received power packet determined in the power transfer contract or a control error packet used for determining an operating point of the power transmitter.

6. The wireless power transmission method of claim 1, wherein the predetermined packet includes a packet including information on a new guaranteed power level of the power transmitter.

7. The wireless power transmission method of claim 1, wherein the transmitting of the power to the power receiver includes receiving a predetermined packet from the power receiver, and
   wherein the indication information is transmitted to the power receiver:
   as a response to the predetermined packet; or within a transmission interval of the predetermined packet when the transmission interval increases to be equal to or more than a threshold.

8. The wireless power transmission method of claim 7, wherein the predetermined packet corresponds to a received power packet for changing a format of a received power packet determined in the power transfer contract or a control error packet used for determining an operating point of the power transmitter.

9. The wireless power transmission method of claim 7, when bit patterns are defined for an acknowledge (ACK) response indicating acceptance of the request of the power receiver included in the predetermined packet, a non-acknowledge (NAK) response indicating denial of the request, and a not-defined (ND) response indicating that the request is not valid,
    wherein a bit pattern of the indication information is defined as a different pattern from the bit patterns of the ACK response, the NAK response, and the ND response.

10. The wireless power transmission method of claim 7, wherein, when the indication information is transmitted to the power receiver as a response to the predetermined packet, the indication information further includes response information to the predetermined packet in addition to the request information.

11. The wireless power transmission method of claim 7, wherein, when the indication information is transmitted within the transmission interval of the predetermined packet, a size of a packet carrying the indication information is determined based on the transmission interval of the predetermined packet.

12. The wireless power transmission method of claim 1, wherein the transmitting of the indication information to the power receiver is performed when the foreign object is detected on the interface surface or when a surrounding temperature is detected as a high temperature equal to or higher than a predetermined temperature.

13. A wireless power reception method executed by a power receiver, the method comprising:

detecting execution of digital ping of a power transmitter and transmitting a response to the detected digital ping;
transmitting configuration information of the power receiver and establishing a power transfer contract based on the configuration information with the power transmitter;
receiving power from the power receiver based on the power transfer contract; and
receiving indication information for initiating communication with the power receiver from the power transmitter;
wherein the indication information includes request information that the power transmitter requests for the power receiver to acquire an authority to transmit a predetermined packet.

14. A power transmitter comprising:
a coil assembly including at least one primary coil generating a magnetic field;
a power conversion unit configured to convert electric energy into a power signal; and
a communications and control unit configured to control communication and power transfer with a power receiver,
wherein the communications and control unit is further configured to:
monitor placement and removal of an object on and from an interface surface of the power transmitter,
perform digital ping and receive a response from the power receiver,
acquire configuration information of the power receiver and generate a power transfer contract with the power receiver by using configuration information,
transmit power to the power receiver based on the power transfer contract, and
transmit indication information for initiating communication with the power receiver to the power receiver,
wherein the indication information includes request information that the power transmitter requests for the power receiver to acquire an authority to transmit a predetermined packet.

* * * * *